(12) United States Patent
Best

(10) Patent No.: US 8,074,634 B2
(45) Date of Patent: Dec. 13, 2011

(54) COOKING APPARATUS WITH CONCAVE EMITTER

(75) Inventor: Willie H. Best, Columbia, SC (US)

(73) Assignee: Char-Broil, LLC, Columbus, GA (US)

( * ) Notice: Subject to any disclaimer, the term of this patent is extended or adjusted under 35 U.S.C. 154(b) by 699 days.

(21) Appl. No.: 11/903,818

(22) Filed: Sep. 25, 2007

(65) Prior Publication Data

US 2008/0072890 A1 Mar. 27, 2008

Related U.S. Application Data

(60) Provisional application No. 60/847,281, filed on Sep. 26, 2006.

(51) Int. Cl.
*F24B 3/00* (2006.01)
*F24C 3/00* (2006.01)
(52) U.S. Cl. .......... 126/25 R; 126/41 R; 99/444; 99/447
(58) Field of Classification Search ............... 126/25 R, 126/41 R, 41 A–41 D, 9 R, 39 J, 39 K; 99/444, 99/447, 445
See application file for complete search history.

(56) References Cited

U.S. PATENT DOCUMENTS

| | | | |
|---|---|---|---|
| 1,399,704 A | | 12/1921 | Eida |
| 1,650,634 A | * | 11/1927 | Lutzler ........................... 99/446 |
| 3,155,814 A | | 11/1964 | Appleman et al. |
| 3,245,458 A | | 4/1966 | Patrick et al. |
| 3,277,948 A | | 10/1966 | Best |
| 3,348,472 A | * | 10/1967 | Anetsberger .................... 99/447 |
| 3,437,415 A | | 4/1969 | Davis et al. |
| 3,561,902 A | | 2/1971 | Best |
| 3,586,825 A | | 6/1971 | Hurley |
| 3,663,798 A | | 5/1972 | Speidel et al. |

(Continued)

FOREIGN PATENT DOCUMENTS

CN 2691267 Y 4/2005

(Continued)

OTHER PUBLICATIONS

P. Sheridan et al., "Application of far infra-red radiation to cooking of meat products", Journal of Food Engineering, 1999, pp. 203-208, vol. 41, Elsevier Science Ltd.

(Continued)

*Primary Examiner* — Kenneth Rinehart
*Assistant Examiner* — Chuka C Ndubizu
(74) *Attorney, Agent, or Firm* — Fellers, Snider, Blankenship, Bailey & Tippens, P.C.

(57) ABSTRACT

An emitter may be positioned for absorbing energy from a burner, and the emitter may include a substantially concave surface for emitting infrared radiant energy so that a substantially uniform distribution of infrared radiant energy is provided at a predetermined plane. The predetermined plane can be referred to as a plane of absorption because, for example, an article for absorbing at least some of the infrared radiant energy may be positioned at the plane of absorption. For example, food can be cooked at the plane of absorption. A support member for supporting the food to be cooked may be proximate the plane of absorption. The support member for supporting the food may be a cooking grid, rotisserie, or other suitable device for supporting the food. In one particular example, the support member is a cooking grid that may be proximate the plane of absorption, or more specifically the cooking grid may be substantially coplanar with the plane of absorption.

36 Claims, 18 Drawing Sheets

U.S. PATENT DOCUMENTS

| | | | |
|---|---|---|---|
| 3,683,058 A | 8/1972 | Partiot | |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |
| 4,207,456 A | 6/1980 | Best | |
| 4,235,023 A | 11/1980 | Best | |
| 4,276,869 A | 7/1981 | Kern | |
| 4,321,857 A | 3/1982 | Best | |
| 4,375,802 A | 3/1983 | Wallasvaara | |
| 4,403,597 A | 9/1983 | Miller | |
| 4,426,792 A | 1/1984 | Best | |
| 4,437,833 A | 3/1984 | Mertz | |
| 4,508,097 A | 4/1985 | Berg | |
| 4,537,492 A | 8/1985 | Lein et al. | |
| 4,546,553 A | 10/1985 | Best | |
| 4,569,657 A | 2/1986 | Laspeyres | |
| 4,575,616 A | 3/1986 | Bergendal | |
| 4,606,261 A | 8/1986 | Bernardi | |
| 4,715,356 A | 12/1987 | Reynolds | |
| 4,785,552 A | 11/1988 | Best | |
| 4,798,192 A | 1/1989 | Maruko | |
| 4,839,502 A | 6/1989 | Swanson et al. | |
| 4,883,423 A | 11/1989 | Holowczenko | |
| 4,886,044 A | 12/1989 | Best | |
| 4,909,137 A | 3/1990 | Brugnoli | |
| 5,024,209 A | 6/1991 | Schaupert | |
| 5,028,760 A | 7/1991 | Okuyama | |
| 5,062,408 A | 11/1991 | Smith et al. | |
| 5,062,788 A | 11/1991 | Best | |
| 5,111,803 A | 5/1992 | Barker et al. | |
| 5,201,133 A | 4/1993 | Best | |
| 5,218,952 A | 6/1993 | Neufeldt | |
| 5,223,290 A * | 6/1993 | Alden | 426/243 |
| 5,230,161 A * | 7/1993 | Best | 34/267 |
| 5,240,411 A | 8/1993 | Abalos | |
| 5,277,106 A | 1/1994 | Raymer et al. | |
| 5,279,277 A * | 1/1994 | Barker | 126/41 R |
| 5,306,138 A | 4/1994 | Best | |
| 5,313,877 A | 5/1994 | Holland | |
| 5,363,567 A | 11/1994 | Best | |
| 5,488,897 A | 2/1996 | Snyder | |
| 5,494,003 A | 2/1996 | Bartz et al. | |
| 5,509,403 A | 4/1996 | Kahlke et al. | |
| 5,513,623 A | 5/1996 | Hong | |
| 5,560,287 A * | 10/1996 | Petelle et al. | 99/451 |
| 5,566,607 A | 10/1996 | Schleimer | |
| 5,567,459 A | 10/1996 | Gonzalez-Hernandez et al. | |
| 5,571,009 A | 11/1996 | Stålhane et al. | |
| 5,582,094 A | 12/1996 | Peterson et al. | |
| 5,594,999 A | 1/1997 | Best | |
| 5,676,043 A | 10/1997 | Best | |
| 5,711,661 A | 1/1998 | Kushch et al. | |
| 5,761,990 A | 6/1998 | Stewart et al. | |
| 5,782,166 A * | 7/1998 | Lin | 99/340 |
| 5,823,099 A | 10/1998 | Ko | |
| 5,879,154 A | 3/1999 | Suchovsky | |
| 5,890,422 A * | 4/1999 | Clark et al. | 99/447 |
| 5,947,007 A * | 9/1999 | O'Grady et al. | 99/340 |
| 5,989,013 A | 11/1999 | Gray | |
| 6,114,666 A | 9/2000 | Best | |
| 6,159,001 A | 12/2000 | Kushch et al. | |
| 6,190,162 B1 | 2/2001 | Smith et al. | |
| 6,205,996 B1 * | 3/2001 | Ryan | 126/41 R |
| 6,260,478 B1 * | 7/2001 | Harneit | 99/446 |
| 6,349,713 B1 * | 2/2002 | Toyama | 126/26 |
| 6,391,383 B1 * | 5/2002 | Matsunaga et al. | 427/219 |
| 6,461,150 B1 | 10/2002 | Sirand | |
| 6,539,843 B2 * | 4/2003 | Andress | 99/385 |
| 6,657,168 B1 | 12/2003 | Lazzer | |
| 6,701,750 B2 * | 3/2004 | Maeda et al. | 65/103 |
| 6,779,519 B2 | 8/2004 | Harneit | |
| 6,783,226 B2 | 8/2004 | Szlucha | |
| 7,202,447 B2 | 4/2007 | Kingdon et al. | |
| 7,241,977 B2 * | 7/2007 | Friedl et al. | 219/411 |
| 2001/0036610 A1 | 11/2001 | Wood | |
| 2002/0020405 A1 | 2/2002 | Coleman et al. | |
| 2004/0060552 A1 | 4/2004 | Yamada et al. | |
| 2004/0152028 A1 | 8/2004 | Singh et al. | |
| 2004/0250688 A1 | 12/2004 | Farkas et al. | |
| 2005/0226976 A1 | 10/2005 | Chung | |
| 2006/0003279 A1 | 1/2006 | Best | |
| 2006/0021517 A1 | 2/2006 | Best | |
| 2006/0266979 A1 | 11/2006 | Ra | |
| 2007/0125357 A1 | 6/2007 | Johnston | |
| 2008/0121117 A1 | 5/2008 | Best | |

FOREIGN PATENT DOCUMENTS

| | | |
|---|---|---|
| DE | 102 15 688 A1 | 11/2003 |
| EP | 0 221 686 A1 | 5/1987 |
| EP | 1 028 292 | 8/2000 |
| EP | 1 096 203 A1 | 5/2001 |
| FR | 1 129 123 | 1/1957 |
| FR | 1 204 968 | 1/1960 |
| FR | 1 387 132 | 1/1965 |
| FR | 2 076 610 | 10/1971 |
| FR | 2 472 141 | 6/1981 |
| GB | 23552 | 0/1915 |
| GB | 432 481 | 7/1935 |
| GB | 562 136 | 6/1944 |
| GB | 576 377 | 4/1946 |
| GB | 1 029 774 | 5/1966 |
| GB | 1 339 345 | 12/1973 |
| GB | 2 362 451 A | 11/2001 |
| GB | 2 409 265 A | 6/2005 |
| JP | 09068321 A * | 3/1997 |
| JP | 2000 121064 | 4/2000 |
| JP | 2004 179089 | 6/2004 |
| WO | WO 2004/103133 | 12/2004 |
| WO | WO 2008/125258 | 10/2008 |

OTHER PUBLICATIONS

P.S. Sheridan et al., "Analysis of yield while cooking beefburger patties using far infrared radiation", Journal of Food Engineering, 2001, pp. 3-11, vol. 51, Elsevier Science Ltd.

N. Shilton et al., "Modeling of heat transfer and evaporative mass losses during the cooking of beef patties using far-infrared radiation", Journal of Food Engineering, 2002, pp. 217-222, vol. 55, No. 3, Elsevier Science Ltd. (Abstract Only).

N.C. Shilton et al., "Determination of the thermal diffusivity of ground beef patties under infrared radiation oven-shelf cooking", Journal of Food Engineering, Mar. 2002, pp. 39-45, vol. 52, No. 1 (Abstract Only).

Y. Takahashi et al., "Impact of IR Broiling on the Thiamin and Riboflavin Retention and Sensory Quality of Salmon Steaks for Foodservice Use", Journal of Food Science, 1987, pp. 4-6, vol. 52, No. 1 (Abstract Only).

P. Sheridan et al., "Application of far infra-red radiation to cooking of meat products", Journal of Food Engineering, 1999, pp. 203-208, vol. 41, No. 3/4, International Food Information Service (Abstract Only).

Cross Section of G3000 Cabinet Unit, Sep. 4, 2001, Thermal Engineering Corp., Columbia, South Carolina.

Cross Section of G-Series Burner System, Sep. 4, 2001, Thermal Engineering Corp., Columbia, South Carolina.

PCT/US2007/020697—International Search Report.

PCT/US2007/020697—Written Opinion of International Searching Authority.

U.S. Appl. No. 11/983,375, filed Nov. 8, 2007, In re: Willie H. Best, entitled Radiant Tube Broiler.

Char-Broil, Assembly Instructions for Models 6320, 6321 & 6323; 1992, pp. 1-18.

Hoyt C. Hottel and Adel F. Sarofim, Marks' Standard Handbook for Mechanical Engineers, Ninth Edition, pp. 4-66 thru 4-79, McGraw-Hill Book Company.

Ane and Huetz-Aubert, "Stratified Media Theory Interpretation of Measurements of the Spectral Polzrized Directional Emissivity of Some Oxidized Metals", 1986, pp. 1191-1208, vol. 7, No. 6, Publisher: Int'l Journal of Thermophysics, Published in: Belgium.

Jones, P.D. and Nisipeanu, E., "Spectral-Directional Emittance of Thermally Oxidized 316 Stainless Steel", 1996, pp. 967-978, vol. 17, No. 4, Publisher: International Journal of Thermophysics, Published in: US.

* cited by examiner

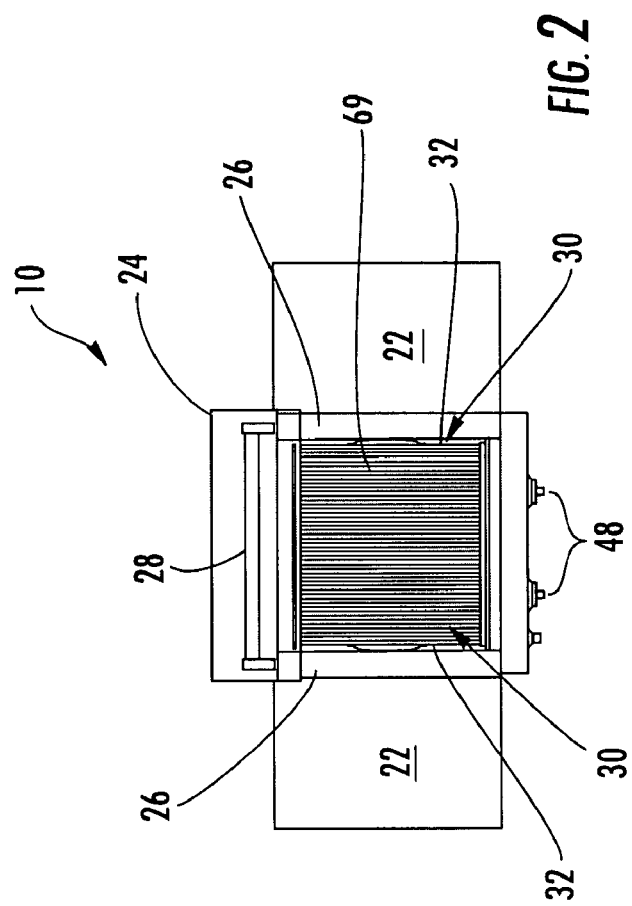
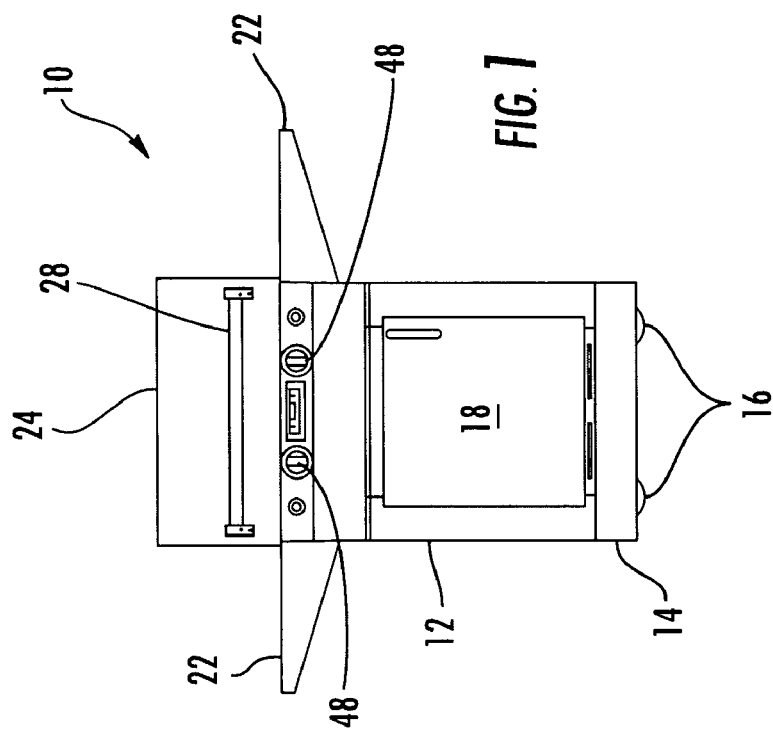

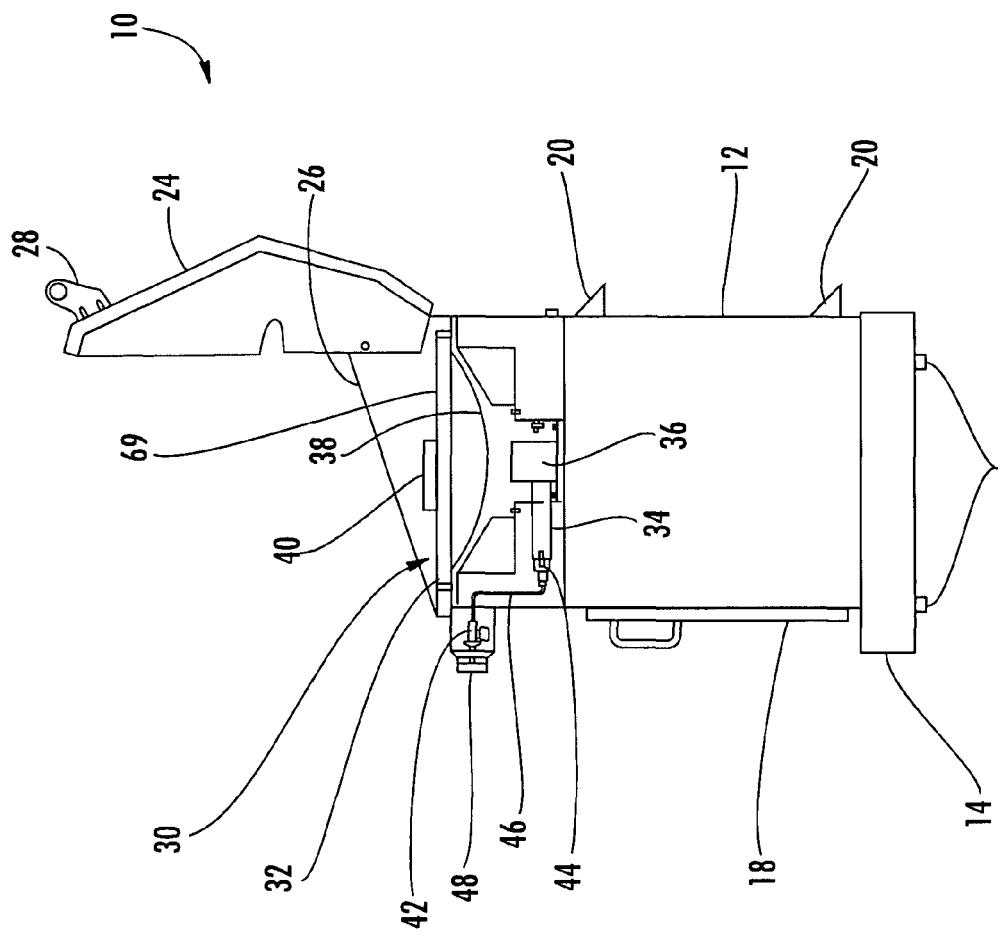

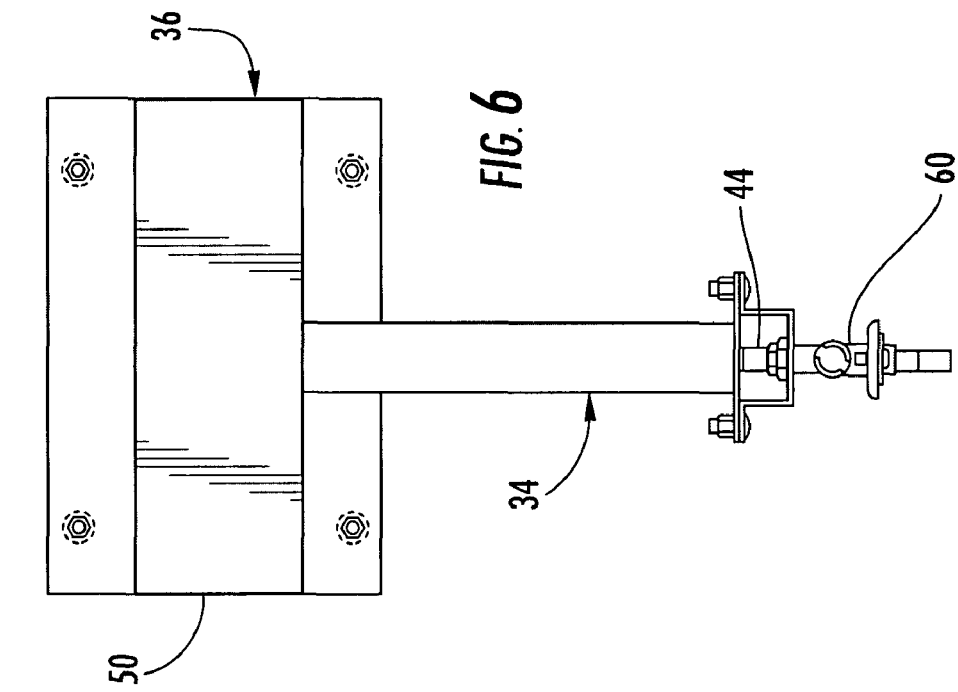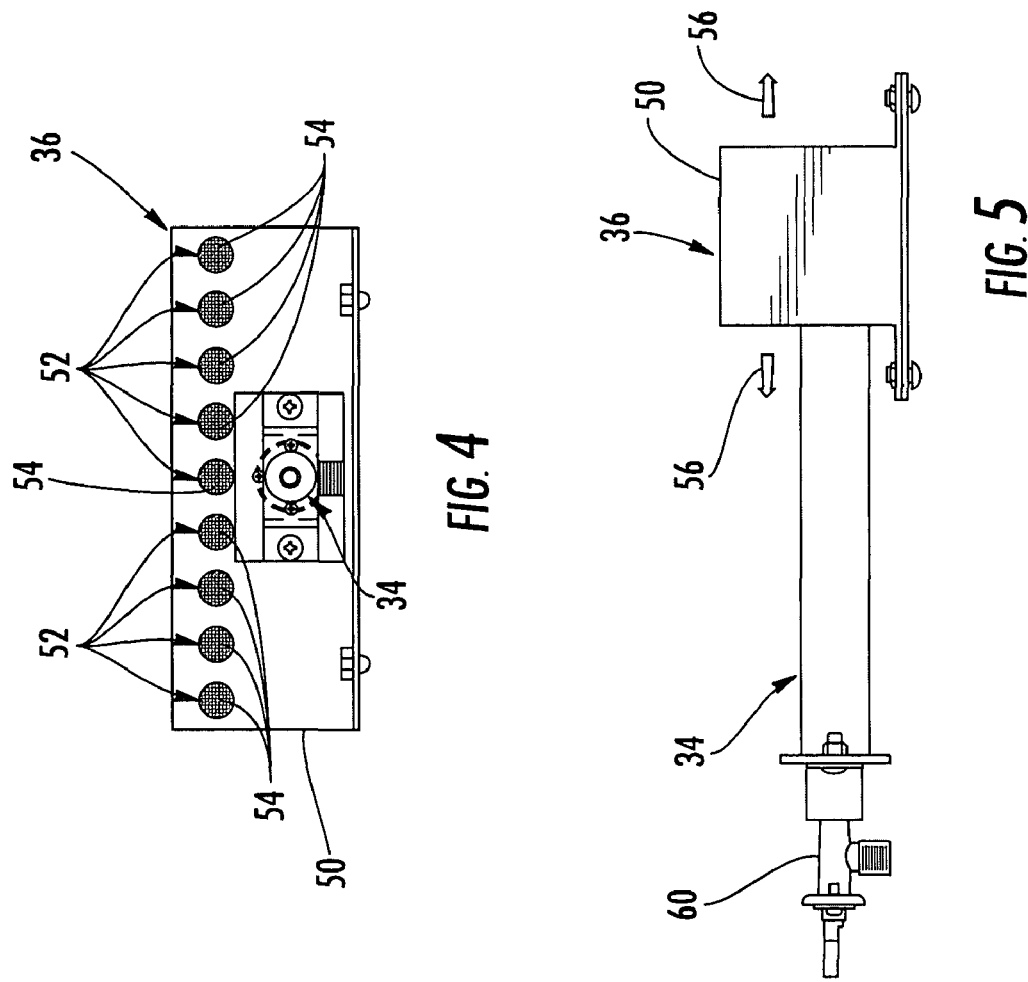

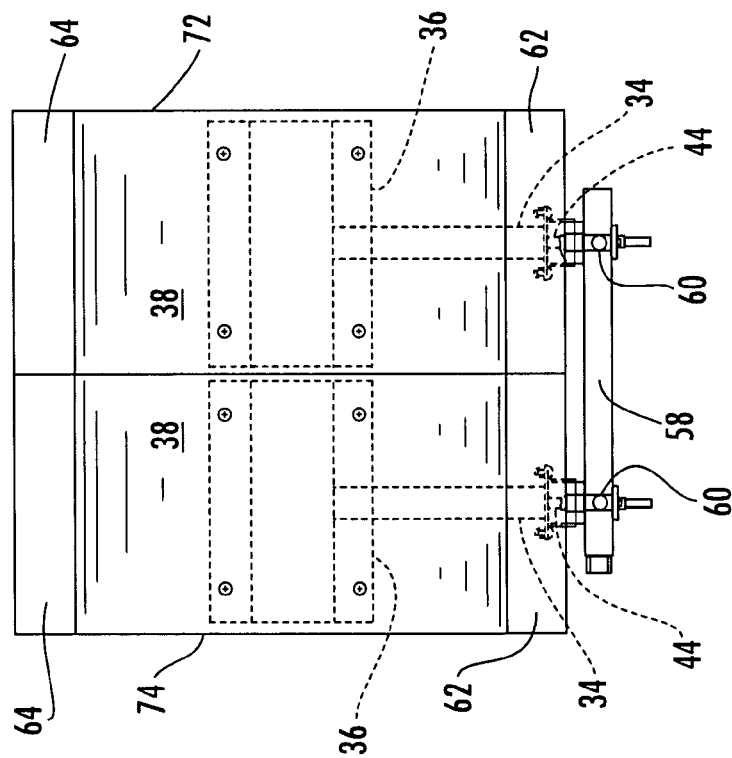
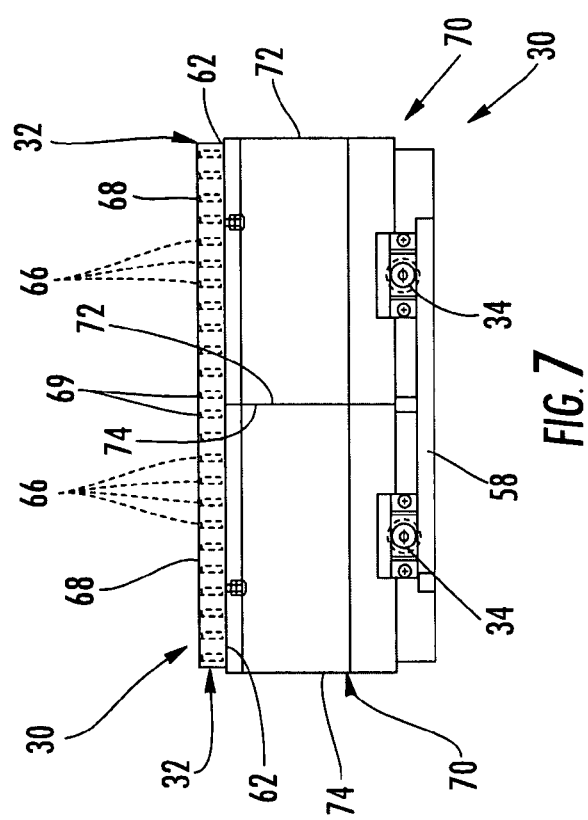
FIG. 8
FIG. 7

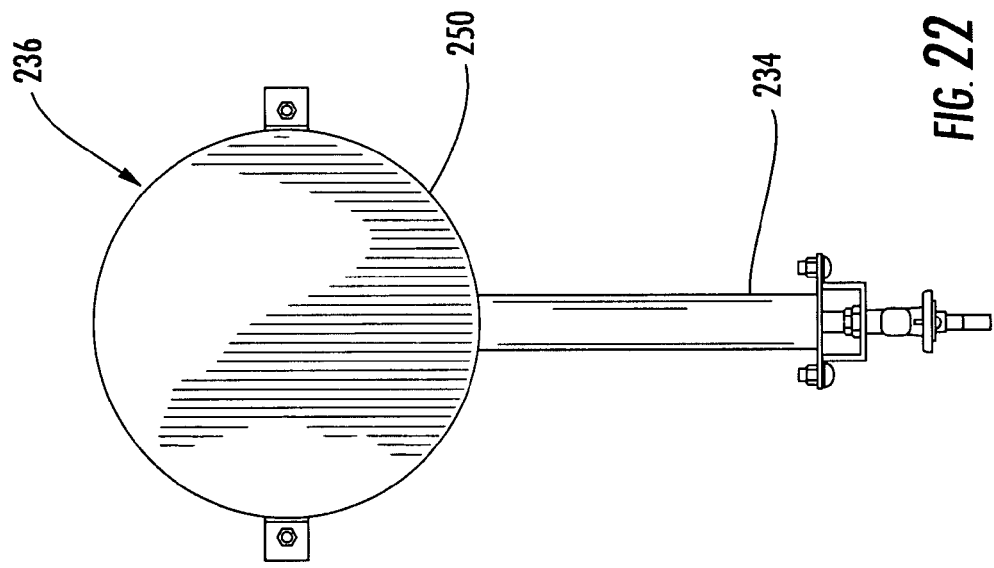
FIG. 22
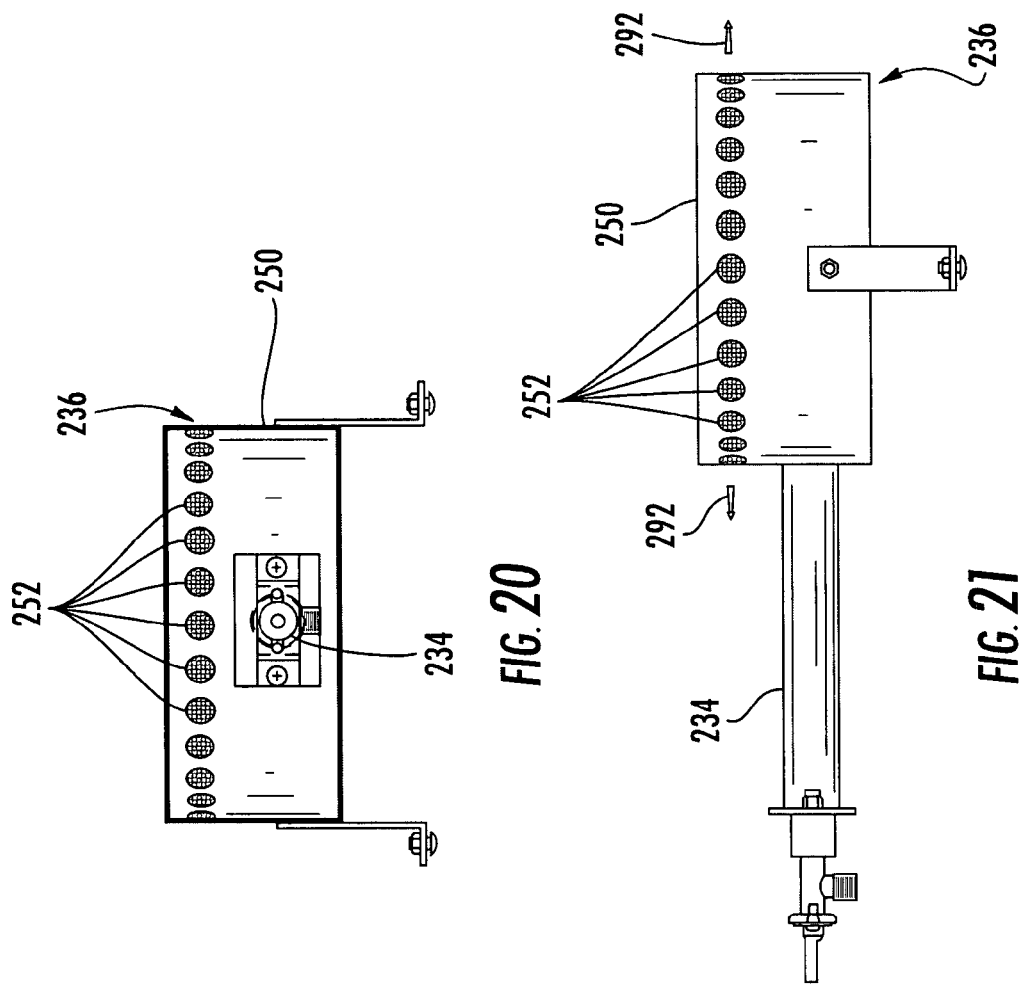
FIG. 20
FIG. 21

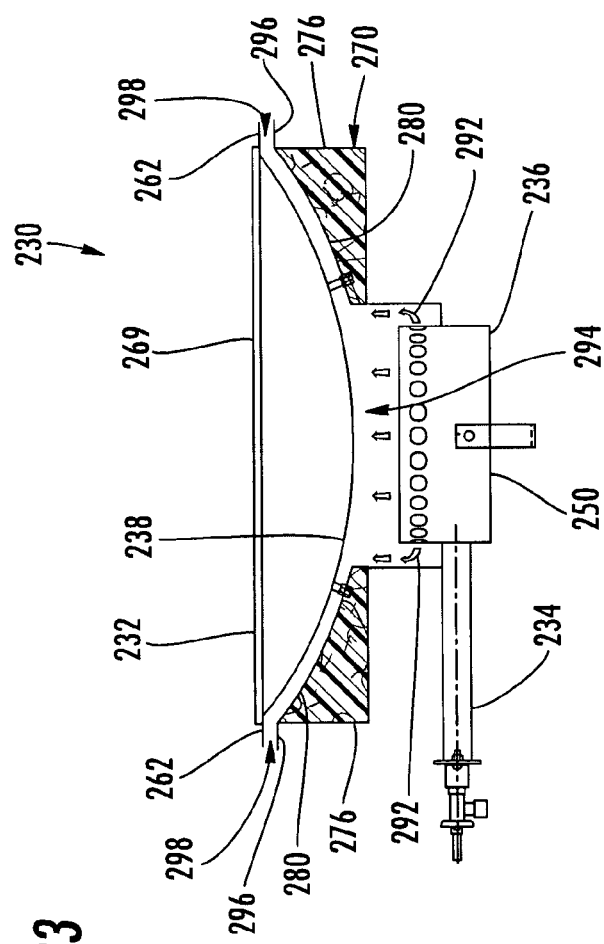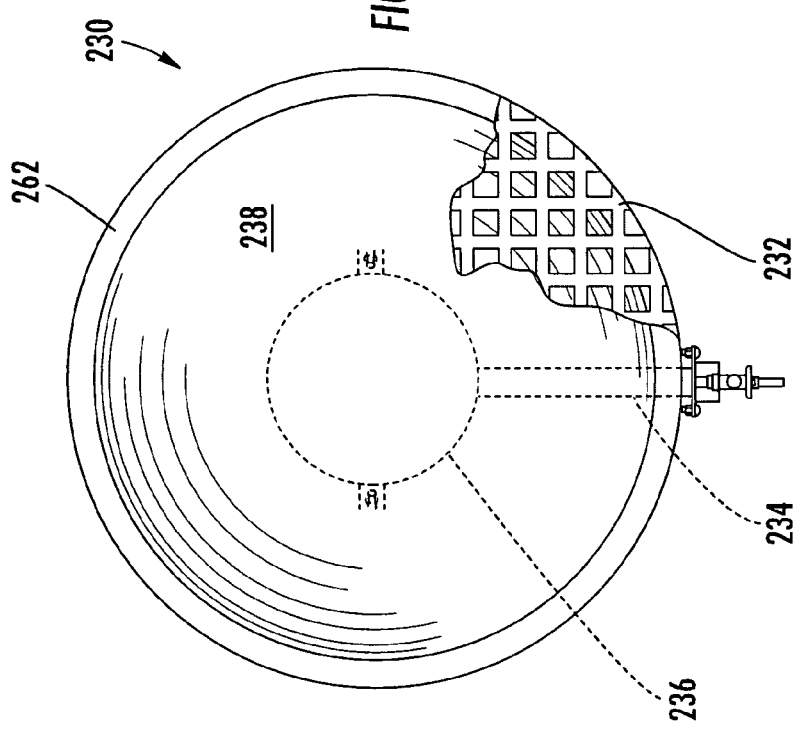

COOKING APPARATUS WITH CONCAVE EMITTER

CROSS-REFERENCE TO RELATED APPLICATION

The present application claims the benefit of U.S. Provisional Application No. 60/847,281, which was filed Sep. 26, 2006. The entire disclosure of U.S. Provisional Application No. 60/847,281 is incorporated herein by reference.

TECHNICAL FIELD

The present invention generally relates to radiant heaters and, more particularly, to grills and other cooking devices that cook with infrared radiant energy.

BACKGROUND

It is known to heat, dry and cook with infrared radiant energy. In particular, gas grills that cook with infrared radiant energy are known. For example, U.S. Pat. No. 3,277,948 to Best describes a prior type of burner used at the present time in most infrared grills. U.S. Pat. No. 4,321,857 to Best describes this prior type of grill. These types of grills produce at least one half of the energy used for cooking in the form of convection (hot air). Examples of exceptions are the infrared burner systems described in U.S. Pat. No. 6,114,666 to Best and U.S. Patent Application Publication No. 2006/0003279 to Best. These allow for at least a majority of the energy used for cooking to be in the form of infrared radiant energy. In addition, U.S. Patent Application Publication No. 2006/0003279 describes, among other things, a gas-fired infrared burner that is configured to nonuniformly heat an infrared energy emitter so that energy is substantially uniformly emitted over the infrared energy emitter.

Whereas the above-mentioned references disclose significant advances, there is always a desire for a different balance of properties.

SUMMARY

In accordance with an embodiment of the present invention, an emitter is positioned for absorbing (e.g., nonuniformly absorbing) energy from a burner, and the emitter includes a substantially concave surface for emitting infrared radiant energy so that a substantially uniform distribution of infrared radiant energy is provided at a predetermined plane. The predetermined plane can be referred to as a plane of absorption because, for example, an article for absorbing at least some of the infrared radiant energy may be positioned at the plane of absorption. For example, food can be cooked (e.g., broiled) at the plane of absorption.

In accordance with some of the embodiments of the present invention, a support member for supporting the food to be cooked is proximate the plane of absorption, whereby one aspect of the present invention is the provision of a cooking apparatus. The support member for supporting the food may be a cooking grid, rotisserie, or other suitable device for supporting the food. In one particular example, the support member is a cooking grid that may be proximate the plane of absorption, or more specifically the cooking grid may be substantially coplanar with the plane of absorption.

In accordance with some of the embodiments of the present invention, the cooking apparatus is a grill that may include a body (e.g., frame, cabinet or other suitable device) having a chamber. The burner may be mounted in the chamber, and the cooking grid is typically positioned above the burner. The emitter may be positioned between the burner and the cooking grid so that the emitter nonuniformly absorbs energy from the burner and emits infrared radiant energy toward the cooking grid. More specifically, the substantially concave surface of the emitter may be oriented toward the cooking grid, so that the emitter provides the substantially uniform distribution of infrared radiant energy in a substantially horizontal, predetermined plane (e.g., plane of absorption) that is proximate the cooking grid. More specifically, the cooking grid may be substantially coplanar with the plane of absorption. Alternatively, the cooking grid may be replaced with another type of device for supporting the food being cooked.

One aspect of the present invention is the provision of a cooking system that can be used to cook (e.g., broil) food using an infrared emitter (e.g., concave emitter) that provides 100% of the energy used for cooking without using a conventional infrared burner. In accordance with this aspect, the infrared emitter may be heated, for example, by a conventional "port-type" convection burner, which may be far less expensive to manufacture than a conventional infrared burner. Alternatively, the infrared emitter may be heated by an infrared burner or any other suitable type of heating mechanism.

In accordance with one aspect of the present invention, an infrared emitter for a grill or other cooking apparatus can be heated in a nonuniform manner by a flame-type convective burner, and the infrared emitter can distribute the infrared radiant energy within a specified plane, which is spaced from the emitter, in a pattern that is more uniform or even than the emission in close proximity to the emitter or at the surface of the emitter. The plane at which the infrared radiant energy can be substantially uniform may be at the plane of the cooking grid, and this plane may be referred to as the plane of absorption. The substantially uniform distribution of the infrared radiant energy can be provided by varying the distance from the surface of the emitter to the plane of absorption.

A physical law of infrared radiation is known as the cosine law of Lambert (1760), which states that the rate of energy radiated in a direction is proportional to the cosine of the angle between the normal to the radiating surface and the direction of radiation, and that the maximum radiation is emitted normal to the emitting surface. Lambert's law applies to diffuse radiation which means distribution of radiant flux to all directions of the space. Therefore, as the distance from the source of emitted radiant energy increases, the area covered by the emitted radiant energy increases and the energy level per unit of area (flux density) of the radiant energy decreases. That is, the increase in area covered by the radiant energy and the decrease in flux density of the radiant energy is a function of the distance from the source of emitted radiant energy. In accordance with one aspect of the present invention, this concept of energy distribution is employed in a manner that places the plane at which the energy is absorbed (e.g., the plane of absorption/the location of the cooking grid) in a spaced relationship to the emitter. In accordance with this aspect, as the intensity of the infrared radiant energy varies from the emitting surface, the distance between the emitter and the plane of absorption is also varied. More specifically in accordance with this aspect, the higher the intensity (flux density), the greater will be the distance between the emitting surface and the plane of absorption; and likewise as the intensity decreases, shorter will be the distance between the emitting surface and the plane of absorption.

In accordance with one aspect of the present invention, the plane at which the energy is absorbed (e.g., the plane of absorption, which is where the cooking grid may be located) may be fixed. Therefore, the emitting surface may account for (i.e., provide) the variation in the distance between the emitter and the plane of absorption. More specifically and in accordance with one example, a concave emitter referenced to the plane of absorption provides an efficient and effective method of varying the distance between the emitter and the plane of absorption to account for the variation in the intensity of the infrared radiant energy over the surface of the emitter.

Other aspects and advantages of the present invention will become apparent from the following.

BRIEF DESCRIPTION OF THE DRAWINGS

Having described some aspects of the invention in general terms, reference will now be made to the accompanying drawings, which are not necessarily drawn to scale and are briefly described below.

FIG. 1 is a front elevational view of a grill with its hood closed, in accordance with a first embodiment of the present invention.

FIG. 2 is a top plan view of the grill of FIG. 1 with its hood open.

FIG. 3 is a schematic, right elevational view of the grill of FIG. 1 with its hood open and a right portion of the grill cut away to show a portion of one of the two cooking apparatuses of the grill.

FIG. 4 is a schematic, isolated, front elevational view of a burner and injector tube of the cooking apparatus of FIG. 3.

FIG. 5 is a schematic, isolated, right elevational view of the burner and injector tube of the cooking apparatus of FIG. 3.

FIG. 6 is a schematic, isolated, top plan view of the burner and injector tube of the cooking apparatus of FIG. 3.

FIG. 7 is a schematic, front elevational view of right and left cooking apparatuses positioned adjacent to one another for both receiving gas from the same manifold, in accordance with the first embodiment of the present invention.

FIG. 8 is a schematic, top plan view of the combination shown in FIG. 7, except that the cooking grids are not shown.

FIG. 20 is a schematic, isolated, front elevational view of a burner and injector tube of a cooking apparatus, in accordance with a fifth embodiment of the present invention.

FIG. 21 is a schematic, isolated, right elevational view of the burner and injector tube of FIG. 20.

FIG. 22 is a schematic, isolated, top plan view of the burner and injector tube of FIG. 20.

FIG. 23 is a partially cut away, schematic, top plan view of the cooking apparatus, in accordance with the fifth embodiment of the present invention.

FIG. 24 is a schematic, right elevational view of the cooking apparatus of FIG. 23, with the right half of the annular burner housing and concave emitter cut away.

DETAILED DESCRIPTION

Figure 9:
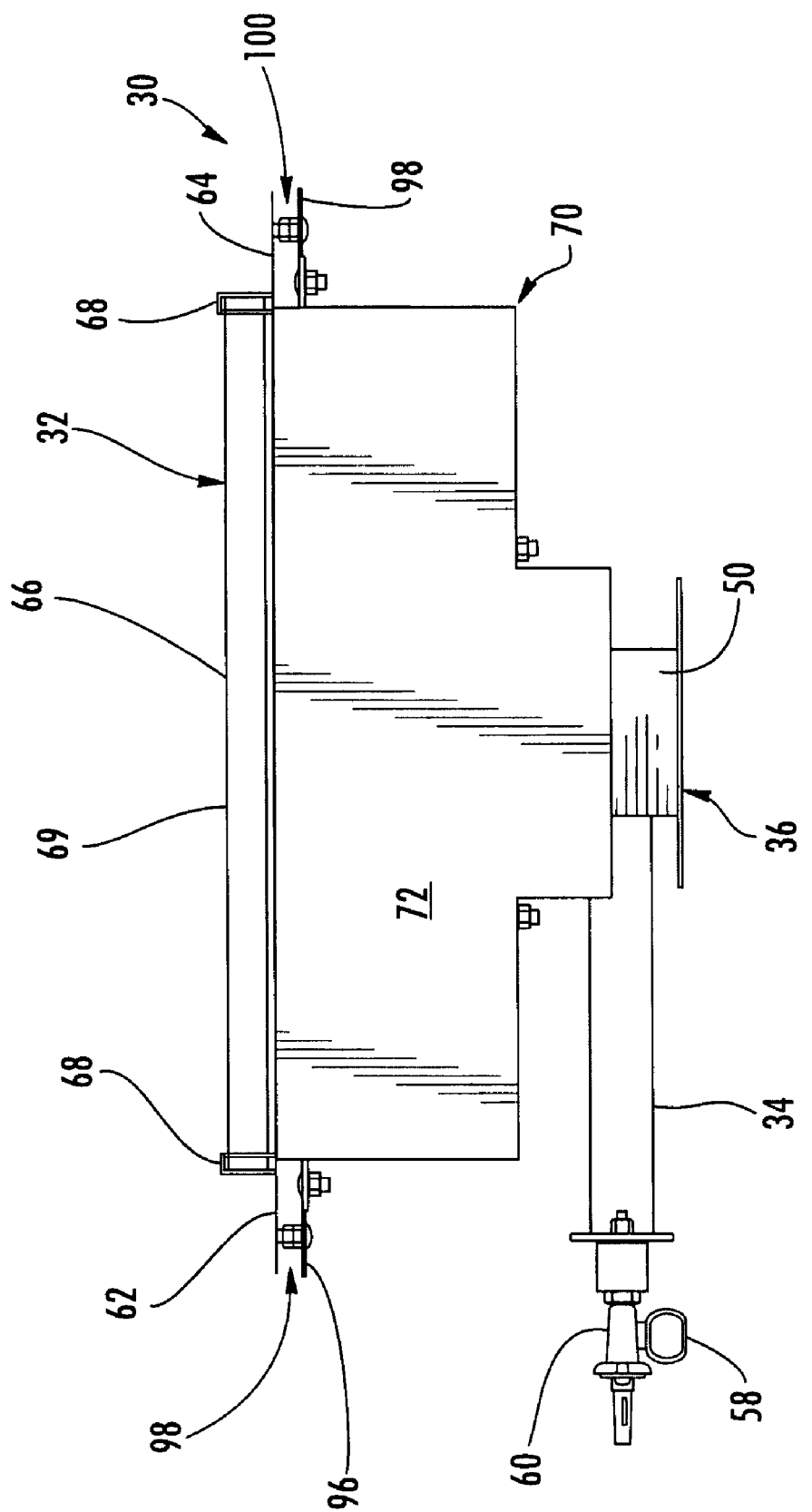
FIG. 9 is a schematic, isolated, right elevational view of one of the cooking apparatuses of FIG. 7, in accordance with the first embodiment of the present invention.

Referring now in greater detail to the drawings, in which like numerals refer to like parts throughout the several views, several examples of embodiments of the present invention are described in the following.

FIG. 1 is a front elevational view of an example of a grill 10 that is described in the following in accordance with a first embodiment of the present invention. The grill 10 includes a body that is shown in FIG. 1 as being in the form of a cabinet 12. Alternatively, the body can be any suitable type of housing, frame, or the like. As shown in FIG. 1, the cabinet 12 is mounted to a base 14 supported by casters 16. An interior of the cabinet 12 can be accessed by way of a front opening to the cabinet. The front opening can be opened and closed by a door 18 that is pivotably mounted to the cabinet 12. The interior of the cabinet 12 can contain a propane tank (not shown), or the like, if needed. The interior of the cabinet 12 can be ventilated by way of vents 20 (FIG. 3). The cabinet 12 includes side shelves 22 respectively mounted to its right and left sides; the shelves can serve as a work space for a user of the grill 10.

FIG. 2 is a top plan view of the grill 10. The grill 10 includes a hood 24 that is shown closed in FIG. 1, and open in FIG. 2. A frame 26 (e.g., heat shield) is mounted to the upper end of the cabinet 12, and the frame includes rear and side walls for at least partially shielding an upper opening of the cabinet. The hood 24 is pivotably mounted to the frame 26 for opening and closing the upper opening of the cabinet. The hood 24 includes a handle 28 for use in opening and closing the hood.

As very generally shown in FIG. 2, and as will be shown and discussed in greater detail below, the grill 10 includes two cooking apparatuses 30 that are mounted to the upper end of the cabinet 12 and extend at least partially into the interior of the cabinet. The two cooking apparatuses 30 are substantially similar to one another, are arranged side-by-side, and may be referred to as a right cooking apparatus and a left cooking apparatus. Whereas the cooking apparatuses 30 are initially shown and described as being part of the grill 10, they are not required to be incorporated into a grill and can be used independently. In accordance with the first embodiment of the present invention, each cooking apparatus 30 includes a cooking grid 32 (e.g., a support member for supporting the food 40 (FIG. 3) to be cooked), so that there are two cooking grids that are arranged side-by-side. The cooking grids 32 together extend across, and thereby partially obstruct, the upper opening of the cabinet 12. There may be a greater or lesser number of cooking apparatuses 30, and a single cooking grid 32 can be integrated into (i.e., shared by) two or more of the cooking apparatuses. Also, the cooking grids 32 can be replaced with a rotisserie mechanism, or any other type of support member for supporting food.

FIG. 3 is a schematic, right elevational view of the grill 10 with the hood 24 open and right portions of the grill cut away to further show a portion of the right cooking apparatus 30. A schematic, left elevational view of the grill 10 with the hood 24 open and a left portion of the grill cut away to further show a portion of the left cooking apparatus 30 is substantially a mirror image of FIG. 3. As will be discussed in greater detail below, each cooking apparatus 30 of the first embodiment includes an injector tube 34 for supplying a gas-air mixture to a burner 36 positioned beneath a concave emitter 38, which is positioned beneath the cooking grid 32 of the cooking apparatus. The burner 36 functions to heat the concave emitter 38 so that the concave emitter emits infrared radiation, such as for cooking (e.g., broiling) food 40 on the cooking grid 32. That is, a concave upper surface of the concave emitter 38 faces, is in opposing face-to-face relationship with and emits infrared radiant energy toward the cooking grid 32. As schematically shown in FIG. 3, a control valve 42 is mounted remotely from an orifice 44 of the injector tube 34 and is connected to the orifice by a tubular pipe 46. The control valve 42 is operated by an adjusting knob 48 or other suitable controller, whereby the supply of a gas-air mixture to the burner 36 is controlled, as discussed in greater detail below. That is, the adjusting knob 48 or other controller can be used to control the cooking temperatures of the grill 10 as needed for cooking different meats or other foods.

Whereas the cooking apparatuses 30 of the first embodiment of the present invention have been described in the context of the grill 10 shown in FIGS. 1-3, the cooking apparatuses may be used in a variety of different applications. For example, one or more of the cooking apparatuses 30 may be built into other types of cabinets, mounted on one or more posts or pedestals, or even placed on a table. Also, the grill 10 can contain a single cooking apparatus 30 or more than two of the cooking apparatuses 30. Also, multiple cooking apparatuses 30 can share a single cooking grid or a single concave emitter, even though each cooking apparatus is described herein as having its own cooking grid 32 and concave emitter 38. That is, variously configured combinations and subcombinations are within the scope of the present invention.

FIGS. 4-6 are schematic, isolated, front elevation, right elevation and top plan views, respectively, of the burner 36 (e.g., port burner) and injector tube 34 of a representative one of the cooking apparatuses 30, in accordance with the first embodiment of the present invention. A left side elevational view of the combination of the burner 36 and the injector tube 34 is a mirror image of FIG. 5. Gas is supplied through the orifice 44 (FIG. 6) of the injector tube 34, whereby the gas is discharged into the entrance of the injector tube and primary air for combustion is drawn through the injector tube and mixed with the gas while passing through the injector tube. The injector tube 34 is mounted to a plenum 50 of the burner 36, so that the gas-air mixture enters the plenum.

An isolated, rear elevational view of the burner 36 is like the image shown in FIG. 4, except that the injector tube 34 and associated hardware would not be seen, and the rear wall of the plenum would not include an opening for the injector tube. That is, the plenum 50 is typically fully closed, except for being open to the injector tube 34 and having a series of side ports 52 that extend along (e.g., are defined through) the opposite front and rear walls of the plenum. That is and in accordance with the first embodiment of the present invention, the top, right, left and bottom walls of the plenum 50 are fully closed. In accordance with the first embodiment of the present invention, each of the side ports 52 of the plenum 50 is covered with a perforated plate 54, so that the gas-air mixture exits the plenum through the perforations of the perforated plate(s). The gas-air mixture that has exited the plenum 50 is ignited. The ignited flames that emanate from the ports 52/perforated plates 54 are schematically represented by arrows 56 in FIG. 5.

More specifically and in accordance with one acceptable example, each of the side ports 52 of the plenum 50 is in the form of an aperture in the respective side wall (i.e., front wall or rear wall) of the plenum, with each aperture being rather large in diameter (e.g., about 0.6250 inches in diameter), with the perforated plate 54 covering the entrance side of the aperture, and the perforated plate having apertures less than about 0.040 inches in diameter. This feature allows the total area of the side ports 52 to increase, which decreases the back pressure and allows the entrance of more primary air than would be possible with single ports capable of quenching the flame. When the primary air is increased, less secondary combustion air is required which decreases excess air required for these types of burners. The reduced secondary air provides for the products of combustion to be at a higher temperature increasing the energy transferred to the concave emitter 38 (FIG. 1).

A burner 36 of the first embodiment of the present invention having the side ports 52 and perforated plates 54 arranged and sized as described above will typically operate with the $CO_2$ at about 6% compared to only 2-3% in typical prior art convective type grills. A burner 36 of the first embodiment of the present invention having the side ports 52 and perforated plates 54 arranged and sized as described above will typically operate with less than 100% excess air, with the carbon monoxide produced being negligible while being able to be fired at higher input rates per inch of burner as compared to the typical type of conventional port burner. In addition, the burner 36 of the first embodiment of the present invention is typically highly resistant to back flashing (combustion occurring in the plenum 50) or to auto ignition of the fuel air mixture within the plenum. Alternatively, the side ports 52 of the plenum 50 are not covered with the perforated plate(s) 54. Alternatively, the burner 36 can be replaced with a conventional port burner or other type of suitable heating device.

Whereas the burner 36 of the first embodiment of the present invention is a port-type gas burner, other types of burners may be used for heating the concave emitter, such as infrared burners. However, a benefit of using the port-type gas burner 36 is that they can be manufactured for far less cost than the infrared types. Also, a port-type burner typically has a better turndown ratio, and when used in cooking applications typically has the ability to operate at much lower energy input for very slow cooking.

FIG. 7 is a schematic, front elevational view of the right and left cooking apparatuses 30 positioned adjacent to one another for both receiving gas from the same manifold 58, in accordance with the first embodiment of the present invention. FIG. 8 is a schematic, top plan view of the right and left cooking apparatuses 30 positioned adjacent to one another and with the cooking grids 32 removed. As best understood with reference to FIG. 8, for each of the injector tubes 34, the gas is supplied from the manifold 58, through a control valve 60 and into the orifice 44. Alternatively, the right and left cooking apparatuses 30 may receive the gas from separate manifolds.

In accordance with the first embodiment of the present invention and as discussed in greater detail below, the concave emitters 38 are typically solid, so that gasses, water, oil, grease and other residues do not pass through the concave emitters. Therefore, FIG. 8 is schematic, for example, in that the burners 36 and portions of the injector tubes 34 that are hidden from view beneath the respective emitter assembly (i.e., the concave emitter 38, a forward flange 62 that extends forwardly from the front edge of the concave emitter, and a rearward flange 64 that extends rearwardly from the rear edge of the concave emitter) are schematically illustrated by dashed lines. In addition, because the burners 36 of the first embodiment of the present invention are fully covered by their respective concave emitter 38 (i.e., fully positioned beneath the respective concave emitter), the burners are substantially protected. Therefore, the burners 36 are substantially wind and water proof (e.g., they are not too susceptible to water damage caused by rain, or the like). Similarly, the burners 36 are typically not damaged or clogged from the cooking process (grease and deposits from the food). As shown in FIG. 8, for each cooking apparatus 30, the burner 36 is substantially centrally located with respect to the concave emitter 38.

Figure 10:
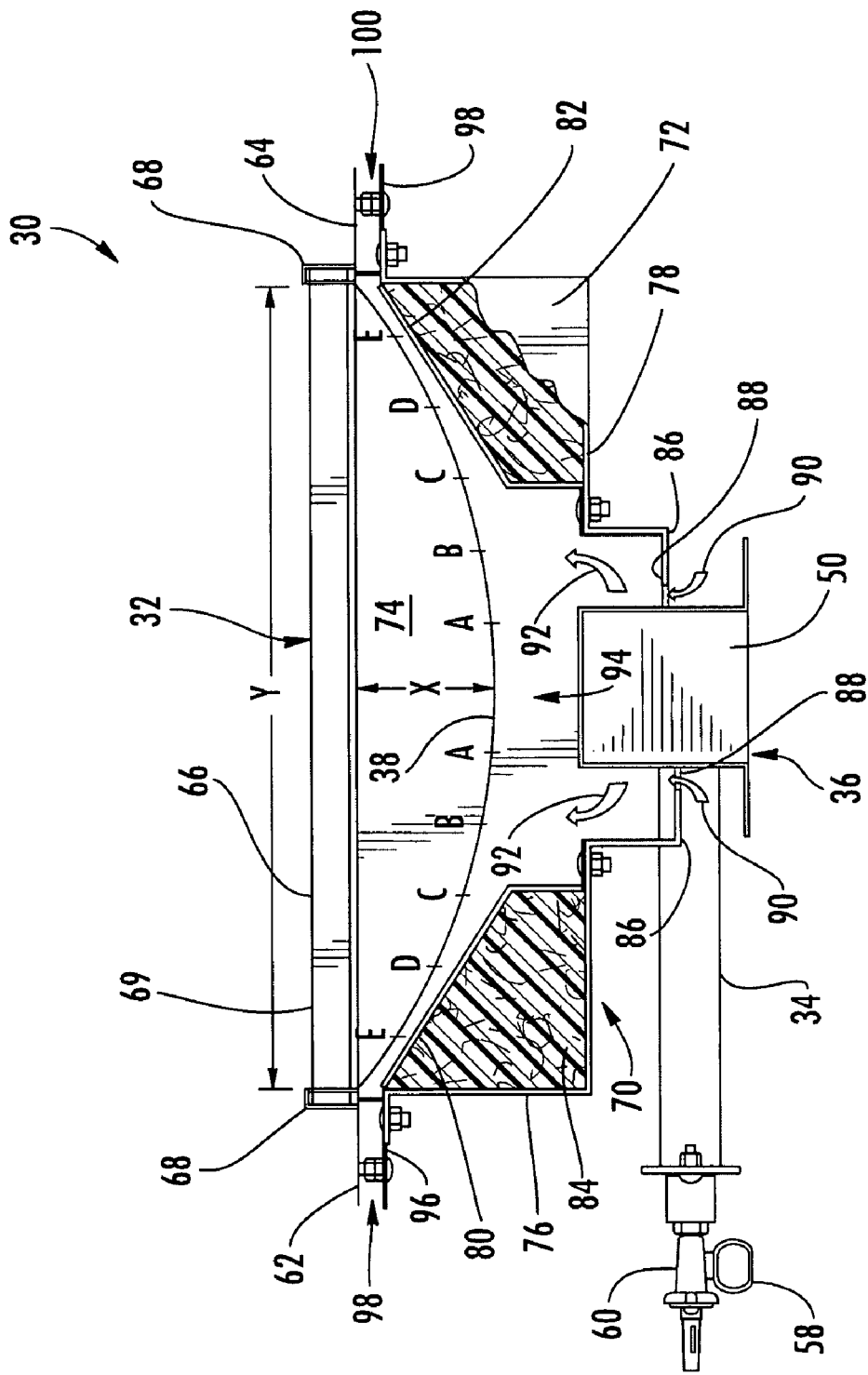
FIG. 10 is like FIG. 9, except that a majority of a right wall of the burner housing of the cooking apparatus has been cut away to show the interior of the burner housing, and additional reference characters are schematically shown, in accordance with the first embodiment of the present invention.

FIG. 9 is a schematic, isolated, right elevational view of one of the cooking apparatuses 30, with a schematic, isolated, left elevational view thereof being a mirror image of FIG. 9. FIG. 10 is like FIG. 9, except that a portion of the cooking apparatus 30 has been cut away to expose the interior of the cooking apparatus 30 and some reference characters have been added, as will be discussed in greater detail below. As can be understood with reference to FIGS. 8 and 10, for each cooking apparatus 30, the concave emitter 38 covers the entire area beneath the cooking grid 32, except that the opposite forward and rearward ends of the cooking grid are positioned upon the forward and rearward flanges 62, 64 of the emitter assembly. As shown in FIG. 10, a front lateral member 68 of the cooking grid 32 sits upon the forward flange 62 of the emitter assembly, a rear lateral member 68 of the cooking grid sits upon the rearward flange 64 of the emitter assembly, and longitudinal members 66 of the cooking grid are suspended above the concave emitter 38. Typically, there are brackets or other alignment mechanisms for engaging and laterally holding the cooking grid 32 in its proper position for cooking, although the cooking grid can typically be easily lifted vertically away from the remainder of the cooking apparatus 30 for cleaning, or the like.

The cooking grid 32, which is typically metal (e.g., stainless steel or any another suitable material), is not novel per se. As best understood with reference to FIGS. 7, 9 and 10, the cooking grid 32 of the first embodiment includes multiple of the longitudinal members 66 that are spaced apart from one another in a lateral direction and have ends that are respectively mounted to the lateral members 68. Only a representative few of the longitudinal members 66 are identified by their reference numerals in the respective figures herewith, and each of them is hidden from view and shown in dashed lines in FIG. 7. In accordance with the first embodiment of the present invention, the upper surfaces (e.g., upper edges) of the longitudinal members 66 of the cooking grid 32 are all substantially in a common plane (e.g., plane of absorption 69) where infrared radiant energy from the concave emitter 38 is absorbed by the food 40 (FIG. 1) being cooked, as will be discussed in greater detail below. The longitudinal members 66 of the cooking grid 32 can run from the front (near side) of the cooking apparatus 30 to the back (far side) of the cooking apparatus, although in some applications the longitudinal members could run between the right and left sides of the cooking apparatus, and other arrangements are also within the scope of the present invention. That is, the cooking grid 32 shown in the drawings is one example of an acceptable support member for supporting food being cooked, and the grids 32 can be replaced with a wide variety of grids or other devices for supporting the food, such as rotisseries or other suitable mechanisms.

As best understood initially with reference to FIGS. 7-10, each of the cooking apparatuses 30 includes a burner housing 70, and a representative one of the burner housings is described in the following, in accordance with the first embodiment of the present invention. Each burner housing 70 includes right and left walls 72, 74 that respectively close the right and left sides of the burner housing and may be insulated to restrict heat transfer therethrough. FIG. 10 is like FIG. 9, except, for example, that a majority of the right wall 72 of the burner housing 70 has been cut away to show the interior of the burner housing and the left wall 74 of the burner housing. In accordance with the first embodiment of the present invention, the right and left walls 72, 74 of the burner housing 70 are identical (except for being respectively mounted at right and left ends of the burner housing 70) and they each extend upwardly past central portions of the concave emitter 38 so that straight upper edges of the right and left walls 72, 74 are at about the same height as each of the opposite front and rear edges of the concave emitter and the forward and rearward flanges 62, 64 of the emitter assembly. Alternatively, the right and left walls 72, 74 of the burner housing 70 may have concave upper edges that extend along the concavity of the concave emitter 38, and the concave upper edges of the right and left walls of the burner housing may be respectively positioned beneath the right and left side edges of the concave emitter so as to support the right and left side edges of the concave emitter.

As best understood with reference to FIG. 10, the burner housing 70 further includes generally zigzag-shaped forward and rearward outer walls 76, 78, although other shapes (e.g., other than zigzagged) are also within the scope of the present invention. The outer walls 76, 78 extend all the way between the right and left walls 72, 74 of the burner housing 70. As best understood with reference to FIG. 10, the burner housing 70 further includes forward and rearward inner walls 80, 82 that extend all the way between the right and left walls 72, 74 of the burner housing 70. The chambers respectively defined between the outer and inner walls 76, 78, 80, 82 of the burner housing 70 can optionally be filled with insulation 84 to restrict heat transfer.

The burner housing 70 includes a lower opening that may be defined between opposite inwardly oriented lower flanges 86 of the burner housing. At least the upper portion of the plenum 50 of the burner 36 extends through the lower opening of the burner housing 70. The burner 36 may be mounted to the burner housing 70 and/or the cabinet 12 (FIGS. 1-3) of the grill 10 by way of brackets, fasteners, welding or any combination thereof, or by any other suitable mechanism. In accordance with the first embodiment of the present invention, the lower portion of the burner housing 70 at least partially defines forward and rearward air inlets 88 for secondary air. For example, the air inlets 88 may be provided by way of there being clearances (e.g., gaps) between edges of the lower flanges 86 of the burner housing 70 and the front and rear walls of the plenum 50 so that the air inlets are elongate and extend from proximate the right side of the burner housing to proximate the left side of the burner housing. As another example, the air inlets 88 may be apertures in the lower flanges 86 of the burner housing 70, with the apertures being arranged in both a front series and a rear series that each extend from proximate the right side of the burner housing to proximate the left side of the burner housing. Alternatively, the air inlets 88 may be provided by any other suitable mechanism. The flow of secondary air through the air inlets 88 is schematically illustrated by arrows 90 in FIG. 10. The secondary air flows up through the air inlets 88 and mixes with the gas-air mixture exiting from the side ports 52 (FIG. 4) of the plenum 50 to complete the combustion process. The resulting flames that are proximate the side ports 52 of the plenum 50 are schematically illustrated by arrows 92 in FIG. 10.

An upper opening to the burner housing 70 is defined between upper edges of the right and left walls 72, 74, and between upper edges of the inner walls 80, 82. The concave emitter 38 fits into the upper opening of the burner housing 70, so that a heating chamber 94 is defined between the interior side (e.g., the convex side) of the concave emitter, the interior surfaces of the burner housing (e.g., interior surfaces of the right and left walls 72, 74 and the surfaces of the inner walls 80, 82 that are in opposing face-to-face relation with the interior side of the concave emitter) and the upper portion of the plenum 50. The upper portion of the burner housing 70 includes outwardly extending forward and rearward upper flanges 96, 98 that may be used to at least partially facilitate mounting of the burner housing to the cabinet 12 (FIGS. 1-3) of the grill 10. The forward and rearward upper flanges 96, 98 may also be used to facilitate mounting of the emitter assembly, and the emitter assembly of the first embodiment includes the concave emitter 38 and the forward and rearward flanges 62, 64 that respectively extend from the front and rear edges of the concave emitter. More specifically, supports such as brackets or any other suitable mechanism (e.g., mounting mechanisms or supporting mechanisms) may respectively extend from the forward and rearward upper flanges 96, 98 of the burner housing 70 to respectively engage and support the forward and rearward flanges 62, 64 of the emitter assembly. In one example, the forward and rearward flanges 62, 64 of the emitter assembly are respectively connected fixedly to mounting mechanisms that are respectively connected fixedly to the forward and rearward upper flanges 96, 98 of the burner housing 70. In another example, the forward and rearward flanges 62, 64 of the emitter assembly respectively rest upon (e.g., without being fixedly connected to) supporting mechanisms that are respectively connected fixedly to the forward and rearward upper flanges 96, 98 of the burner housing 70 so that the emitter assembly can be easily removed from the remainder of the cooking apparatus 30, such as for cleaning, as will be discussed in greater detail below.

When the cooking apparatus 30 is fully assembled, the forward and rearward upper flanges 96, 98 of the burner housing 70 are respectively at least partially vertically spaced apart from the forward and rearward flanges 62, 64 of the emitter assembly so that vertical gaps/forward and rearward exhaust ports 98, 100 are respective in communication with the heating chamber 94. Regarding the heating chamber 94 more specifically, oblique portions of the inner walls 80, 82 are in opposing face-to-face relation with the inner side of the concave emitter 38. The oblique portions of the inner walls 80, 82 are not required to be oblique, but these oblique or differently configured portions of the inner walls typically extend along and are in opposing face-to-face relation with the inner side of the concave emitter 38 so that the heating chamber 94 includes forward and rearward heating channels that extend along the interior surface of the concave emitter respectively to the exhaust ports 98, 100. The oblique portions of the inner walls 80, 82 may be modified to have a curvature that is parallel to (e.g., substantially similar to) the curvature of the facing portions (e.g., lower, convex portion) of the concave emitter 38.

In accordance with a version of the first embodiment of the present invention and as discussed in greater detail below, the concave emitter 38 is typically solid and the heating chamber 94 is typically fully closed, except for being open to the ambient environment at the air inlets 88 and exhaust ports 98, 100, and being in communication with the interior of the plenum 50 by way of the side ports 52 (FIG. 4) of the plenum. Accordingly and as best understood with reference to FIGS. 8 and 10, for each cooking apparatus 30, the concave emitter 38 (which is typically solid) fully covers the burner 36/extends under substantially all of the cooking grid 32 (e.g., except for the opposite ends of the cooking grid that are upon the forward and rearward flanges 62, 64, whereby the concave emitter substantially extends under the central area of the cooking grid) so as to prevent the hot gases in the heating chamber 94 from passing through the cooking grid 32, and the concave emitter 38 is heated by the hot gasses in the heating chamber. The typically solid concave emitter 38 directs the hot gases in the heating chamber 94 so that they are discharged from the heating chamber only at the peripherally arranged exhaust ports 98, 100. That is and in accordance with a version of the first embodiment of the present invention, the hot products of combustion (which have a drying effect) are substantially prevented from contacting the food 40 (FIG. 3) that is upon the cooking grid 32, so that the food that is upon the grid is cooked with almost 100% infrared radiant energy that originates from the upwardly oriented concave side of the concave emitter 38 (e.g., the food that is upon the cooking grid is cooked with substantially 100% infrared radiant energy). That is, when the food 40 that is upon the cooking grid 32 is cooked, the cooking of the food that occurs by way of convection and conduction is negligible, although the cooking grid will typically become hot enough so that the cooking grid forms some grid-shaped sear marks on the food.

As will be discussed in greater detail below and in accordance with the first embodiment of the present invention, the concave emitter 38 is arranged so that as the flux density of the infrared radiant energy emitted from the upper surface of the concave emitter decreases, the distance from the concave emitter to the cooking grid 32 also decreases, due to the concave shape of the upper surface of the concave emitter. As a result, a substantially uniform distribution of infrared radiant energy is provided in a substantially horizontal, predetermined plane that is proximate the cooking grid 32. The substantially horizontal, predetermined plane is proximate where the food 40 (FIG. 3) on the cooking grid 32 is located, so that the food is exposed to the substantially uniform distribution of infrared radiant energy. Accordingly, the substantially horizontal, predetermined plane may be referred to as a plane of absorption 69, since the food 40 on the cooking grid 32 absorbs the infrared radiant energy and is thereby cooked. The upper surfaces of the longitudinal members 66 of the cooking grid 32 are for supporting the food 40 being cooked, such that it is typically desirable for the plane of absorption 69 to be positioned substantially proximate and substantially parallel to the upper surfaces (e.g., upper edges) of the longitudinal members; however, variations may be acceptable. Whereas the plane of absorption 69 of the first embodiment extends substantially horizontally, it may be arranged differently, if desired.

In various examples, the plane of absorption 69 is substantially parallel with and within about 0.25 inches of the upper surfaces of the longitudinal members 66 of the cooking grid 32, or the plane of absorption is substantially parallel with and within about 0.5 inches, about 0.75 inches, about 1.0 inch, about 1.25 inches or about 1.5 inches from the upper surfaces of the longitudinal members of the cooking grid. That is, typically the plane of absorption 69 will be positioned substantially parallel with and substantially proximate the upper surfaces of the longitudinal members 66. This can be accomplished, for example, with the plane of absorption 69 being substantially parallel with and positioned proximate the lower surfaces of the longitudinal members 66 of the cooking grid 32, for example if the height of the cooking grid is not too great, such as the cooking grid having a height of about 1.0 inch or less, or about 1.5 inches or less. The height of the cooking grid 32 may be measured from the bottom of the longitudinal members 66 to the top of the longitudinal members while the cooking grid is in its horizontal configuration. That is and more generally, the plane of absorption 69 will typically be positioned proximate the cooking grid 32.

The cooking grid 32 can be replaced with other structures that provide the desired result. As one example, in some situations the cooking grid 32 is not used for supporting the food 40 (FIG. 3) to be cooked, and the cooking grid can be replaced with other types of supports, or the like, that are suitable for providing one or more functions described herein with respect to the cooking grid. As another example, the cooking grid 32 can be replaced with a rotisserie mechanism, or any other type of support member for supporting food.

As mentioned above, hot gases, which are from the combustion (schematically represented by the arrows 92) that is proximate the side ports 52 (FIG. 4) of the plenum 50, flow upwardly in the heating chamber 94 and impinge on and heat the concave emitter 38. As the hot gasses flow through the heating channels of the heating chamber 94 toward the exhaust ports 98, 100, the hot gasses continue to heat the concave emitter 38. The products of combustion then emerge from the heating chamber 94 by way of the exhaust ports 98, 100, which are typically positioned for discharging the hot gasses (e.g., products of combustion) so that the hot gasses discharged from the exhaust ports are prevented from passing through the cooking grid 32. As a result, when the concave emitter 38 is solid, the food 40 (FIG. 3) that is upon the cooking grid 32 is cooked with substantially 100% infrared radiant energy. In addition and in accordance with the first embodiment of the present invention, the infrared radiant energy emitted by the typically solid concave emitter 38 is primarily in the long wavelengths of the infrared region of the electromagnetic spectrum, and this fact combined with the concept of preventing any products of combustion from contacting the food 40 provides an ideal energy source for broiling the food. More specifically, infrared energy emitted at the longer wavelengths is better suited for broiling than infrared energy emitted at shorter wavelengths. In accordance with the first embodiment of the present invention, more than 60% of the infrared radiant energy emission from the concave emitter 38 will be at wavelengths longer than 5 microns when the cooking apparatus 30 is operated at its highest energy consumption, and when the cooking apparatus is turned down to its lowest input for very slow cooking more than 80% of the radiant emission from the concave emitter 38 will be at wavelengths longer than 5 microns.

FIG. 10 is schematic, for example, in that imaginary (e.g., theoretical) positions on the concave emitter 38 are provided for purposes of the explanation that is provided below, in accordance with the first embodiment of the present invention. A shown in FIG. 10, the imaginary positions consist of a center position X, two positions A, two positions B, two positions C, two positions D and two positions E. Comparing the temperature of the hot gasses in the heating chamber 94 at the imaginary positions A-E when the burner 36 is operating, the hottest gases are at positions A and A, and that the gas temperature decreases as it passes positions B, C, D, E. Therefore, the temperature of the concave emitter 38 decreases from position A of the concave emitter to position E of the concave emitter. Also, the distance between the concave emitter 38 and the plane of absorption 69 decreases from position A to position E. As shown in FIG. 10, this may be accomplished by the upper surface of the concave emitter 38 being curvilinear and concave in shape (e.g., substantially concave) with respect to the plane of absorption 69. That is, the concave emitter 38 is concave (e.g., substantially concave) with reference to the plane of absorption 69. Whereas the overall upper surface of the concave emitter 38 is concave relative to the plane of absorption 69, segments and/or surfaces of the concave emitter can be shaped from curvilinear segments, concave segments, convex segments, straight segments or any combination thereof, with the concave emitter still being substantially concave with reference to the plane of absorption 69.

Figure 11:
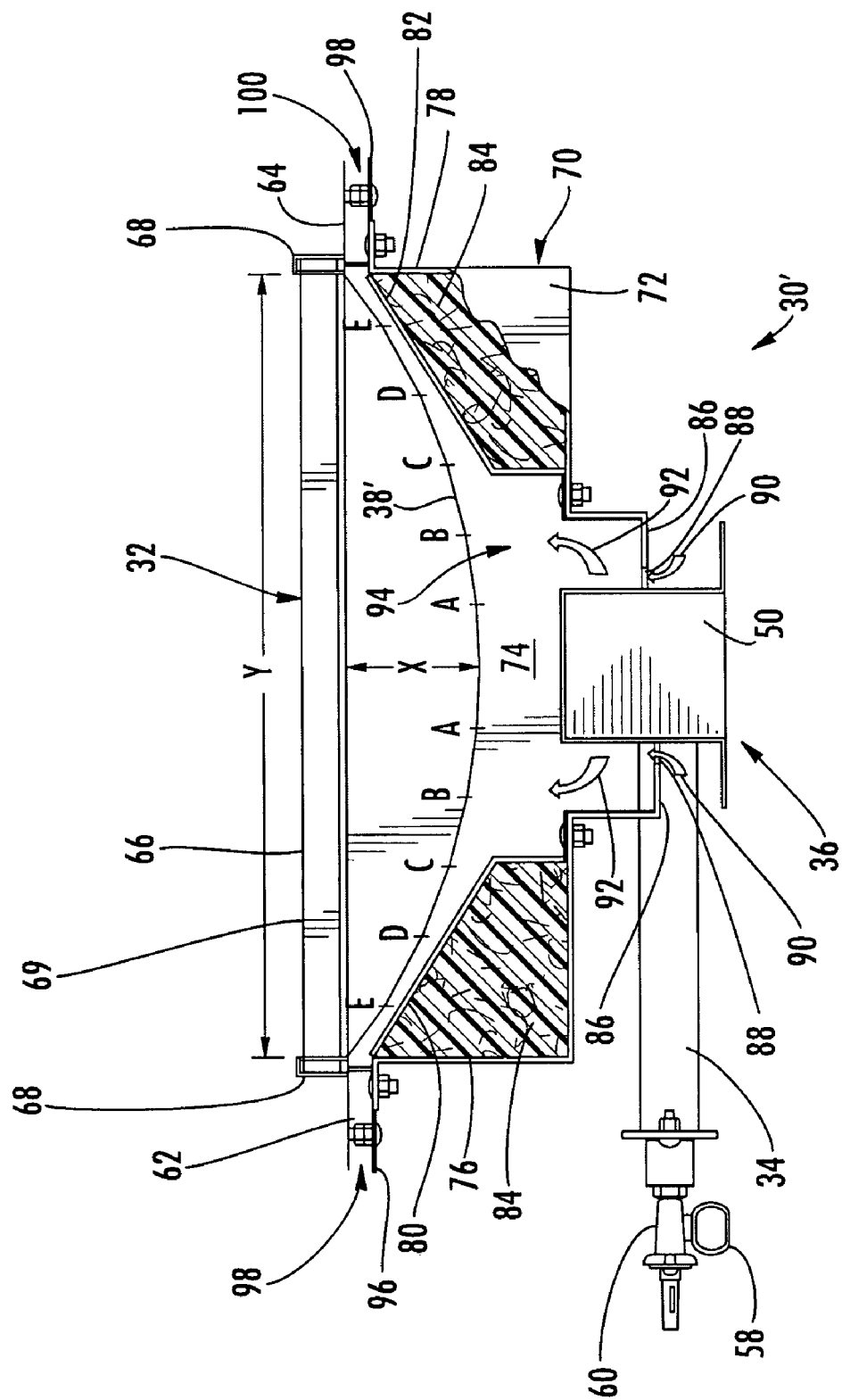
FIG. 11 is like FIG. 10, except that FIG. 11 illustrates a second embodiment of the present invention, in which the concave emitter comprises a plurality of straight segments.

For example, a second embodiment of the present invention is like the first embodiment of the present invention, except for variations noted and variations that will be apparent to one of ordinary skill in the art. FIG. 11 is like FIG. 10, except that FIG. 11 illustrates a cooking apparatus 30' of the second embodiment. As schematically shown in FIG. 11, the concave emitter 38' is formed by a series of straight segments with angles respectively interposed therebetween to achieve the variation in the depth of the concave emitter, such that the concave emitter 38' of the second embodiment is substantially concave with reference to the plane of absorption 69, and the concave emitter 38'/cooking apparatus 30' of the second embodiment operates in substantially the same way as the concave emitter 38/cooking apparatus 30 of the first embodiment.

At position X in FIGS. 10 and 11, the upper concave surface of the concave emitter 38, 38' is at its maximum depth. In order to minimize flare up, it may be desirable to lower the temperature in the relatively lower region of the upper concave surface of the concave emitter 38, 38' that includes the position X, since the residue (e.g., oils and juices) from the broiling process will tend to flow to the lowest position of the solid concave emitter. In accordance with the first and second embodiments of the present invention, while the cooking apparatus 30, 30' is fully operating (e.g., operating at high fire), the temperature at the position X on the upper surface of the concave emitter 38, 38' is lower than the temperature at adjacently outwardly positions (e.g., relatively higher regions that respectively include positions B) because, for example, the burner 36 employs the plenum 50 with the side ports 52

(FIG. 4) as opposed to ports on top of the plenum. For example, the width (e.g., distance from the front wall to the rear wall) of the plenum 50 can be varied to control the width of this optional relatively "cool zone" of the concave emitter 38, 38'. The relatively cool zone is typically positioned at the relatively lower region (e.g., central region) of the solid concave emitter 38, 38', so that the relatively lower region is maintained at a lower temperature than relatively higher region(s) of the solid concave emitter. The relative cool zone seeks to eliminate flare up, especially when the cool zone is (e.g., typically the cool zone is) maintained at a temperature below the ignition temperature of the residues (e.g., oils) that are discharged from the cooking process.

More specifically and in contrast to the versions of the first and second embodiments of the present invention that employ solid concave emitters 38, 38', flare up or uncontrolled burning of the oils from meat during the broiling process can be a problem with prior art grills in which the combustion surface (flame) is directly exposed to the meat or associated oils, or when any surface exposed to the meat or associated oils is operated above the ignition temperature of the oils and air is available to support combustion. In contrast, the first and second embodiments of the present invention seek to avoid flair up by providing the relatively cool zone at the point(s) (e.g., position X) of the concave emitter 38, 38' where the oils are likely to accumulate. However, even if flare up or uncontrolled burning occurs on the upper surface of the concave emitter 38, 38', in accordance with one acceptable method, the flame may be extinguished with a small amount of water because the solid concave emitter is somewhat pan-like (e.g., the ends of the concave emitter are closed by the right and left walls 72, 74 of the burner housing 70) such that a small amount of water contained in the "pan" is converted to steam to extinguish the flame. That is, the concave emitters 38, 38' are typically solid and constructed of a material that will not break during performance of the procedure described immediately above.

FIGS. 10 and 11 are schematic, for example, in that imaginary dimensions X and Y, which are perpendicular to one another, are provided for purposes of explanation. The dimension X represents the depth of the concave emitter 38, 38', whereas the dimension Y represents the distance between the front and rear edges of the concave emitter. The flux density of the infrared radiant energy at the plane of absorption 69 can be varied by varying the dimension X for a fixed dimension of Y. As the dimension X is increased an increase in the flux density can be shifted to position E to the extent that it is nearly equal to that at position A. Conversely, as X is decreased with Y fixed, the flux density at A increases. The dimension X is, at times, referred to in the following as the maximum depth of the concave emitter 38, 38'.

The temperature at the concave upper surface of the concave emitter 38, 38' can also be varied by methods other than varying the distance of the emitting surface of the concave emitter from the plane of absorption 69. By increasing the velocity of the hot gas passing within the heating chamber 94/under the concave emitter 38, 38', the coefficient of convective heat transfer between the hot gasses within the heating chamber and the concave emitter can be increased. This can be accomplished, for example, by decreasing the flow area of the heating channels of the heating chamber 94. However, the amount that the heating channels can be restricted (flow area decreased) is typically limited due to poor combustion which generates excess carbon monoxide unless the combustion air is forced (e.g., through use of a combustion air blower) which would require electrical power which is typically not practical in many applications such as in a gas grill. In accordance with the first and second embodiments of the present invention, a combustion air blower, or the like, is not used, so that the convective heat transfer in the heating chamber 94 is substantially by way of natural heat convention (free convention), rather than forced convection. Alternatively, a combustion air blower, or the like, could be used.

Figure 12:
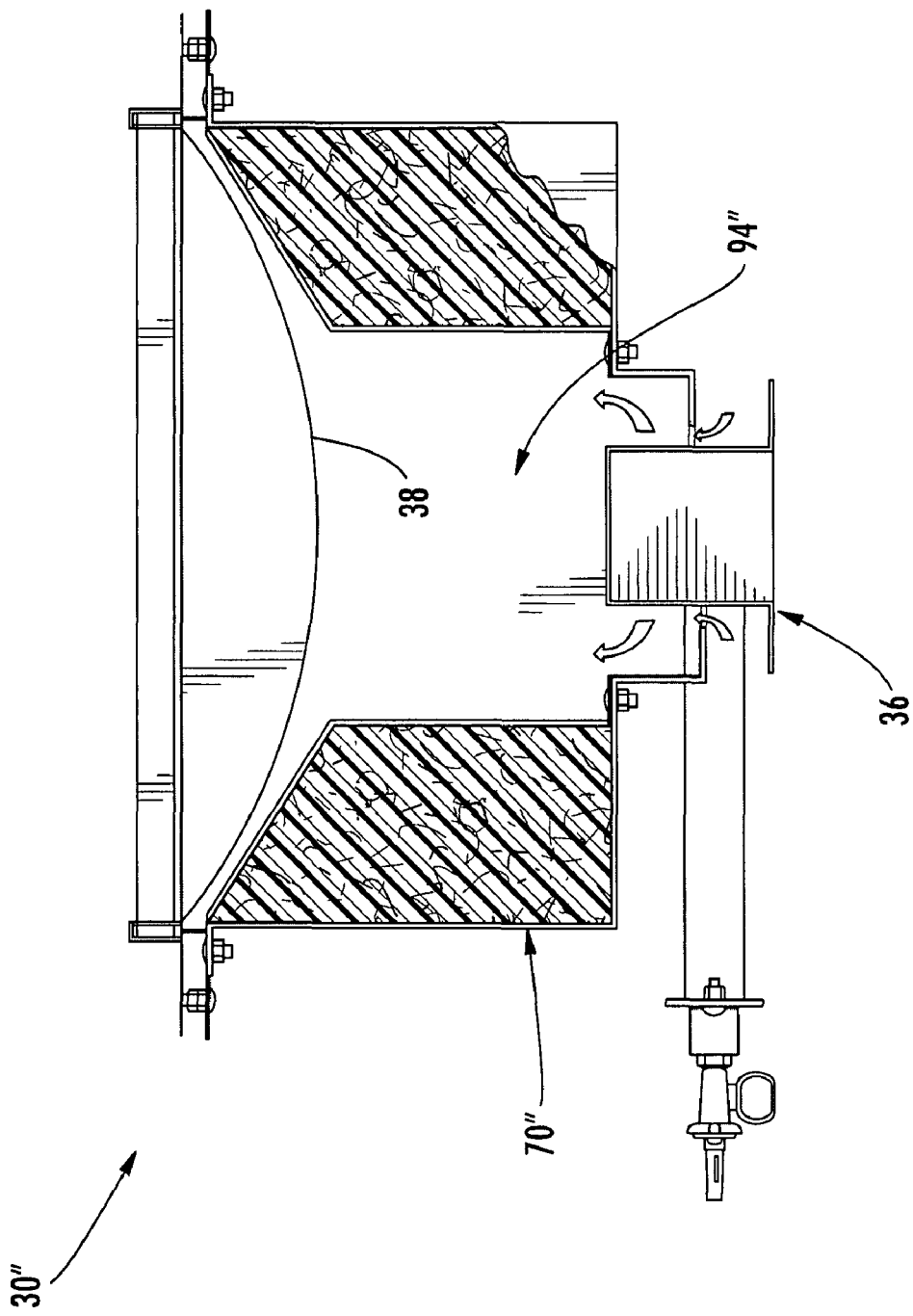
FIG. 12 is similar to FIG. 10, except that FIG. 12 is illustrative of a third embodiment of the present invention which employs a burner housing with increased height.

Distribution of the infrared radiant energy emitted by the concave emitter 38, 38' can also be improved by increasing the distance between the burner 36 and the concave emitter. As best understood with reference to FIG. 12, which is like FIG. 10 except that FIG. 12 illustrates a third embodiment, this method can allow the hot gases within the heating chamber 94" to spread and contact all of the concave emitter 38 at about the same temperature. The third embodiment of the present invention is like the first embodiment of the present invention, except for variations noted and variations that will be apparent to one of ordinary skill in the art. As shown in FIG. 12 and as compared to FIG. 10, the cooking apparatus 30" of the third embodiment differs in that the height of the burner housing 70" (i.e., the distance from the lower portion of the burner housing to the upper portion of the burner housing) has been increased, so that the distance between the burner 36 and the concave emitter 38 is larger in the third embodiment than in the first embodiment. However, improving infrared radiant energy distribution by increasing the distance between the burner 36 and the concave emitter 38 decreases efficiency and increases the material used.

The total infrared radiant energy generated by the embodiments of the present invention described in this disclosure may be calculated by using the Stefan Boltzmann equation, which is described in the following, for example, with reference to the first embodiment of the present invention.

$$Q = AC F_e F_a (T_1^4 - T_2^4)$$

Q=Total emission of radiant energy in unit of time (BTUH) for area A (all wavelengths)
A=Area of emitting surface
C=Constant $0.173 \times 10^{-8}$ (The Stefan Boltzmann Constant)
$F_e$=Emissivity (to allow of surfaces from that of a Black Body)
$F_a$=Configuration Factor (unity in this case)

Figure 13:
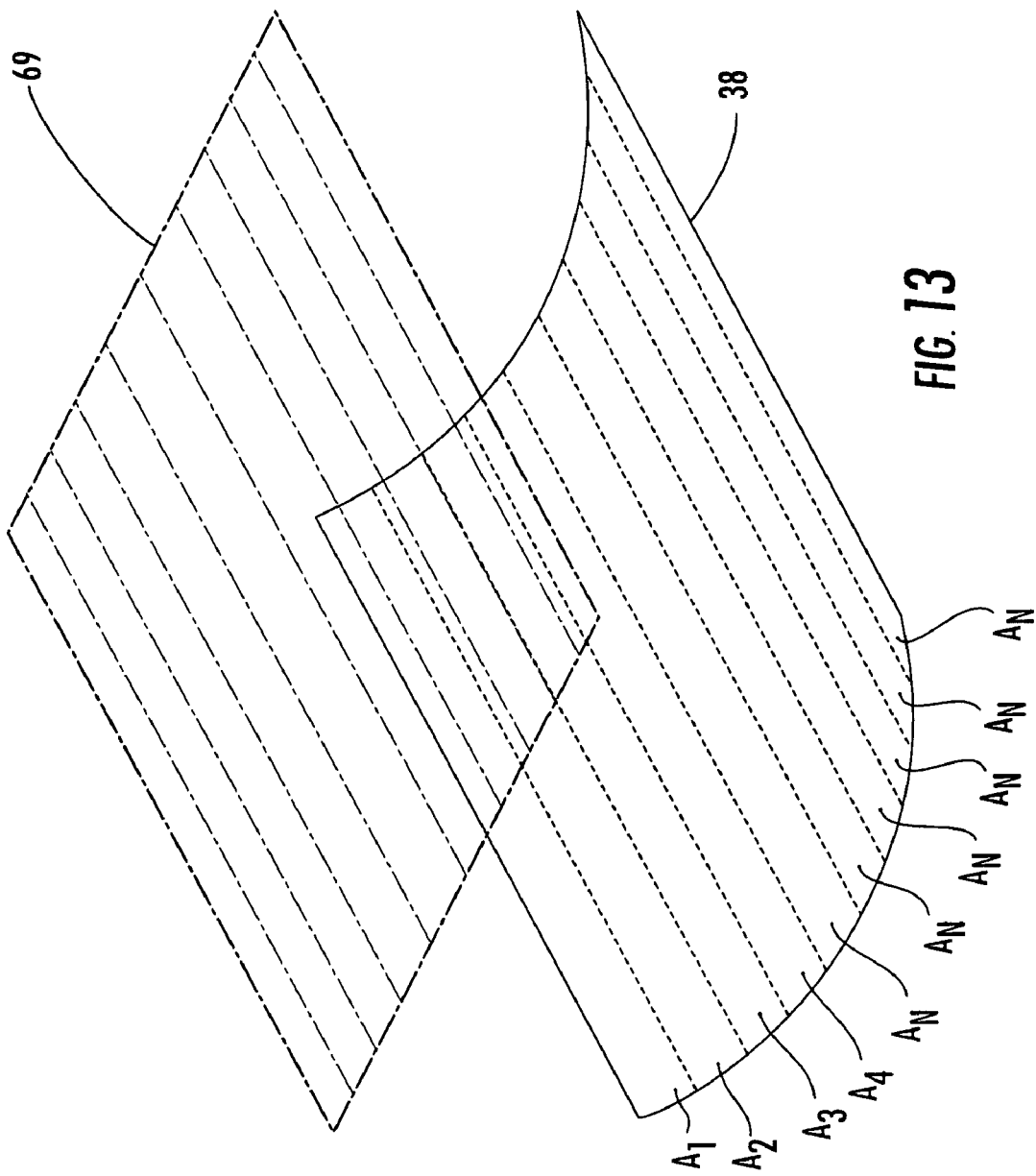
FIG. 13 is a schematic, perspective view of a concave emitter and an associated plane of absorption that has been exploded away from the concave emitter, wherein the concave emitter and plane of absorption have been schematically segmented, in accordance with the first embodiment of the present invention.

Since the temperature of the concave emitter 38 varies, the calculation for the total infrared radiant energy emitted will account for this variation. A simple and exemplary method to accomplish this (e.g., approximate this) is to theoretically segment the concave emitter 38 and determine the infrared radiant energy emitted per segment, and use the sum of the energy per segment to obtain (e.g., approximate) the total infrared radiation. In this regard, FIG. 13 is an isolated, schematic, perspective view of the concave emitter 38 and its associated plane of absorption 69, wherein the plane of absorption 69 has been exploded away from the concave emitter in an effort to clarify the view. FIG. 13 is schematic, for example, because the concave emitter 38 has been schematically segmented (with dashed lines) into one inch segments $A_1, A_2, A_3, A_4 \ldots A_n$. FIG. 13 is also schematic, for example, because the plane of absorption 69, which is present by virtue of being the location at which the substantially uniform distribution of infrared radiant energy is provided, is not shown as being directly associated with a physical structure in FIG. 13; therefore, the perimeter of the plane of absorption is schematically represented by dashed lines in FIG. 13 as being a projection of the peripheral edges of the concave emitter 38. Similarly, the dashed lines that define the segments $A_1, A_2, A_3, A_4 \ldots A_n$ in FIG. 13 are projected to (e.g., schematically shown on) the plane of absorption 69. As shown in FIG. 13, the plane of absorption 69 has a substantially rectangular periphery, although other peripheral shapes are also within the scope of the present invention.

In accordance with the first embodiment of the present invention, the concave emitter 38 has substantially straight opposite front and rear edges, and opposite right and left edges that are substantially concave with respect to the plane of absorption 69. Accordingly, the vertical projection of the concave emitter 38, plan views of the concave emitter 38 and the plane of absorption 69 each have substantially straight opposite front and rear edges, and substantially straight opposite right and left edges. In accordance with one version of the first embodiment of the present invention, the vertical projection of the concave emitter 38 and the plane of absorption 69 each extend over an area of at least about a square foot, and more specifically they are each about 16 inches (i.e., the dimension Y in FIG. 10 is about 16 inches) by 19 inches such that they each extend over an area of at least about 304 square inches (e.g., at least about 2 square feet), and depth of the concave emitter (e.g., specified by the dimension X in FIG. 10) is about 4 inches. As shown in FIG. 13, each of the segments $A_1, A_2, A_3, A_4 \ldots A_n$ of the concave emitter 38 has a length that is parallel to the axis of the curve of the concave emitter (e.g., the lengths extend from the right edge to the left edge of the concave emitter) and a width that extends perpendicular to the axis of the curve of the concave emitter, with the length being longer than the width.

Referring back to the Stefan Boltzmann equation, since the useful infrared radiant energy will typically be absorbed within the perimeter of the plane of absorption 69, the configuration factor $F_a$ will equal 1. Also, since the temperature of the absorbing surface (e.g., food 40 (FIG. 1)) at the plane of absorption 69 is relatively low compared to the temperature of the concave emitter 38, for the purpose of this calculation $T_2^4$ may be ignored. Therefore the simplified equation to determine (e.g., approximate) the total infrared radiant energy at all wavelengths is reduced to the following, in accordance with the first embodiment of the present invention:

$$Q = (0.173 \times 10^{-8})(0.94)[A_1 T_1^4 + A_2 T_2^4 + A_3 T_3^4 + \ldots A_N T_N^4]$$

The above equation demonstrates that for a given temperature of the concave emitter 38, the total radiation is a function of the emissivity and the area of the concave emitter. Therefore it can be advantageous for the emissivity to be as close to that of a black body as practical. The most practical material for the concave emitter 38 is metal. Most metals in their original form have poor or low emissivity. Therefore and in accordance with the first embodiment, in an effort to insure the maximum performance of the emitter 38, the metal surface of the emitter 38 typically should be modified to increase the emissivity to be as near a black body as reasonably practical. For example rather than limitation, an emissivity of 0.94 is used in the equation for the determination of the total infrared radiant energy because, in accordance with the first embodiment of the present invention, the concave emitter 38 is coated with a ceramic coating with an emissivity of 0.94. Nonetheless, other emitters, coatings and emissivities are within the scope of the present invention. For example, another method to improve the emissivity is to oxidize the metal surface of a concave emitter. An increase in the emissivity can also be obtained by roughening the surface of the concave emitter. One efficient method to change the structure of the surface of the concave emitter is to sand blast the concave emitter. Better results are typically achieved when the surface is sand blasted and oxidized. Some types of stainless steel such as 410 stainless steel will oxidize more readily than others. Also the surface of the concave emitter can be coated with a material (ceramic, glass or other high temperature material) that will provide for the surface emissivity to increase. Another example of a suitable material for the concave emitter 38 is high temperature porcelain, which can optionally be coated onto metal.

Because of the concave shape of the concave emitter 38 and in general that the upper surface of the concave emitter is about horizontal for the first embodiment, the heat removed from the surface by convection is rather minor. That is, most of the energy from the concave emitter 38 is transferred by infrared radiation. In versions of the first embodiment in which the emissivity of the concave emitter 38 is relatively low, the surface temperature of the concave emitter will tend to increase to offset the low emissivity. Since the emitted energy is a function of the temperature to the forth power ($°R^4$) a temperature increase of only 100° F., from 900° F. to 1,000° F. will increase the radiant output more than 30% for a black body. With a very low emissivity the increase would not be as significant. However, this operating characteristic of the concave emitter 38 does not completely offset the benefit of a reasonable emissivity for the concave emitter. The same amount of infrared radiant energy can be generated at a lower surface temperature of the concave emitter by increasing the emissivity of the concave emitter. Operating the cooking apparatus 30 at a lower temperature in and of itself may provide a benefit, such as increased material life and a lower temperature of exposed surfaces. While a low emissivity of the concave emitter 38 would not preclude the primary function of the grill 10 (i.e., cooking food, primarily meat) it is typically desirable to have the emissivity of at least the concave upper surface of the concave emitter be above 0.6 to keep the emitter temperature lower for the same infrared radiant energy output. That is, in the first through fifth embodiments described herein, the concave emitters are typically solid, and for each concave emitter, its emissivity, or at least the emissivity of its concave side, is at least about 0.6, or alternatively it can be above 0.6, or alternatively it can be at least about 0.7, or alternatively it can be at least about 0.8, or alternatively it can be at least about 0.9.

In accordance with alternative embodiments of the present invention, the solid concave emitters of the first through fifth embodiments described herein are replaced with emitters that are not solid (e.g., concave emitters/concave emitting surfaces with one or more openings (e.g., holes), such as perforated emitters, screen-type emitters, grate-like emitters, emitters in the form of overlapping plates with gaps therebetween, or the like, can be used). In contrast to the embodiments of the present invention that are illustrated in FIGS. 1-25, when non-solid concave emitters are used in accordance with the alternative embodiments, hot gases in the heating chamber (e.g., heating chamber 94) may pass through the non-solid concave emitters, such that the hot gasses may, for example, pass through the support member for supporting the food (e.g., cooking grid 32) and come into contact with the food on the cooking grid. As one example, it may be advantageous to use the non-solid concave emitters in applications where food is not being cooked (although solid concave emitters may also be used in such applications), such as in applications where items and/or coatings (e.g., paint, and the like) are to be heated (e.g., dried), in which case the cooking grid 32 may be replaced with whatever type of devices might be useful for supporting the items to be heated. That is, the present invention is not limited to applications in which food is to be cooked (i.e., features of the present invention may have a wide range of uses that are not intended to be limited to the examples provided in this disclosure).

Figure 14:
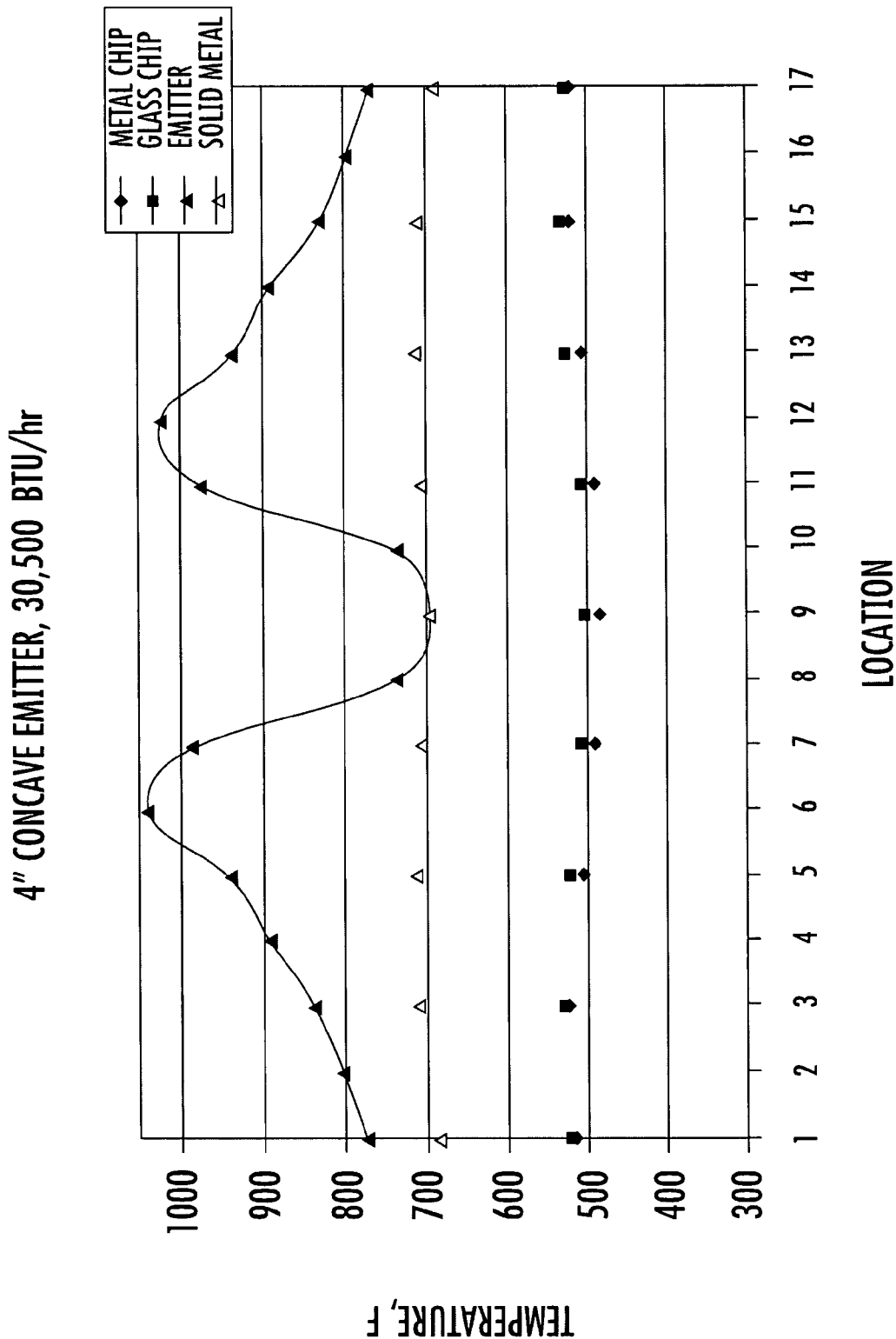
FIG. 14 is a diagram that illustrates the distribution of energy associated with a concave emitter, with measurements taken in lines that are perpendicular to the axis of the curve of the concave emitter, in accordance with the first embodiment of the present invention.

FIG. 14 shows the distribution of energy associated with an example of the solid concave emitter 38 of the first embodiment, wherein the concave emitter has a depth (dimension X) of about 4 inches and a projected area (e.g., plane of absorption 69 (FIG. 13)) of about 16 inches (dimension Y) by about 19 inches, and the cooking apparatus 30 is operating at least close to its high setting (e.g., the total infrared radiant energy provided by the cooking apparatus 30 (i.e., by the concave emitter 38) is about 30,500 BTU/hr at high fire). For FIG. 14, the temperature measurements were taken at segmented locations that are serially arranged generally from the front to the rear of the cooking apparatus 30, in a manner similar to that shown in FIG. 13. The distribution of the temperature at the concave emitter 38 was determined by measuring the temperature of the upper concave surface of the concave emitter in one inch segments that each have a length that is parallel to the axis of the curve of the concave emitter, and a width that extends perpendicular to the axis of the curve of the concave emitter. The temperature measurements for the concave emitter 38 were taken at the concave surface of the concave emitter 38 along a line that is perpendicular to the axis of the curve of the concave emitter. The concave surface of the concave emitter 38 is referred to as "emitter" in the legend of FIG. 14. As shown in FIG. 14, the energy distribution at the concave surface of the concave emitter 38 is not uniform. In particular, the energy (e.g., temperature) distribution at the concave surface of the concave emitter 38 is in the form of a valley between two peaks, and more specifically the values at the opposite ends of the distribution are higher than the lowest point of the valley. That is, and as mentioned above, a relatively "cool zone" (e.g., which seeks to avoid flair ups, and the like) may be present such as at the lowest area of the concave surface of the concave emitter 38. In accordance with the first embodiment, the cool zone is centrally located on the concave emitter 38 (e.g., approximately between locations 8 and 10 in FIG. 14). As apparent from FIG. 14, at least a portion of the concave surface of the concave emitter 38 reaches at least about 700° F., and more specifically a majority of the concave surface of the concave emitter 38 reaches at least about 700° F. As also apparent from FIG. 14 and more specifically, the temperature of the concave surface of the concave emitter 38 ranges from at least about 600° F. to at least about 900° F., and even more specifically it ranges from at least about 650° F. to at least about 1000° F.

The distribution of the energy at the plane of absorption 69 was determined several times/three examples are shown in FIG. 14, and for each the temperature measurements were taken at surface(s) located at, or at least substantially proximate to, the plane of absorption, with the temperatures taken along a line that is perpendicular to the axis of the curve of the concave emitter 38. In one example shown in FIG. 14, the temperature measurements were taken at the surface of a broad metal plate made of thin stainless steel having a high emissivity coating, and this broad metal plate is referred to as "solid metal" in the legend of FIG. 14. The transfer of energy by conduction in the horizontal plane of the metal plate was negligible because of the ability of the plate to radiate the absorbed energy and the thin cross section of the metal plate. As shown in FIG. 14, the surface temperatures of the broad metal plate (referred to as "solid metal" in the legend of FIG. 14) were each at about 700° F.; therefore, the energy distribution at the plane of absorption 66 was reasonably uniform (e.g., substantially uniform).

In second and third examples that are partially shown in FIG. 14, the distribution of the energy at the plane of absorption 69 was determined by measuring the temperature of approximately one inch square absorbers (i.e., "metal chips" and "glass chips" respectively referenced in the legend of FIG. 14) placed on two inch centers at the plane of absorption. As shown in FIG. 14, the energy distribution at the plane of absorption is reasonably uniform (e.g., substantially uniform) for each of the second and third examples. For each of the second and third examples, the temperatures of the absorbers were each at about 500° F.

Figure 15:
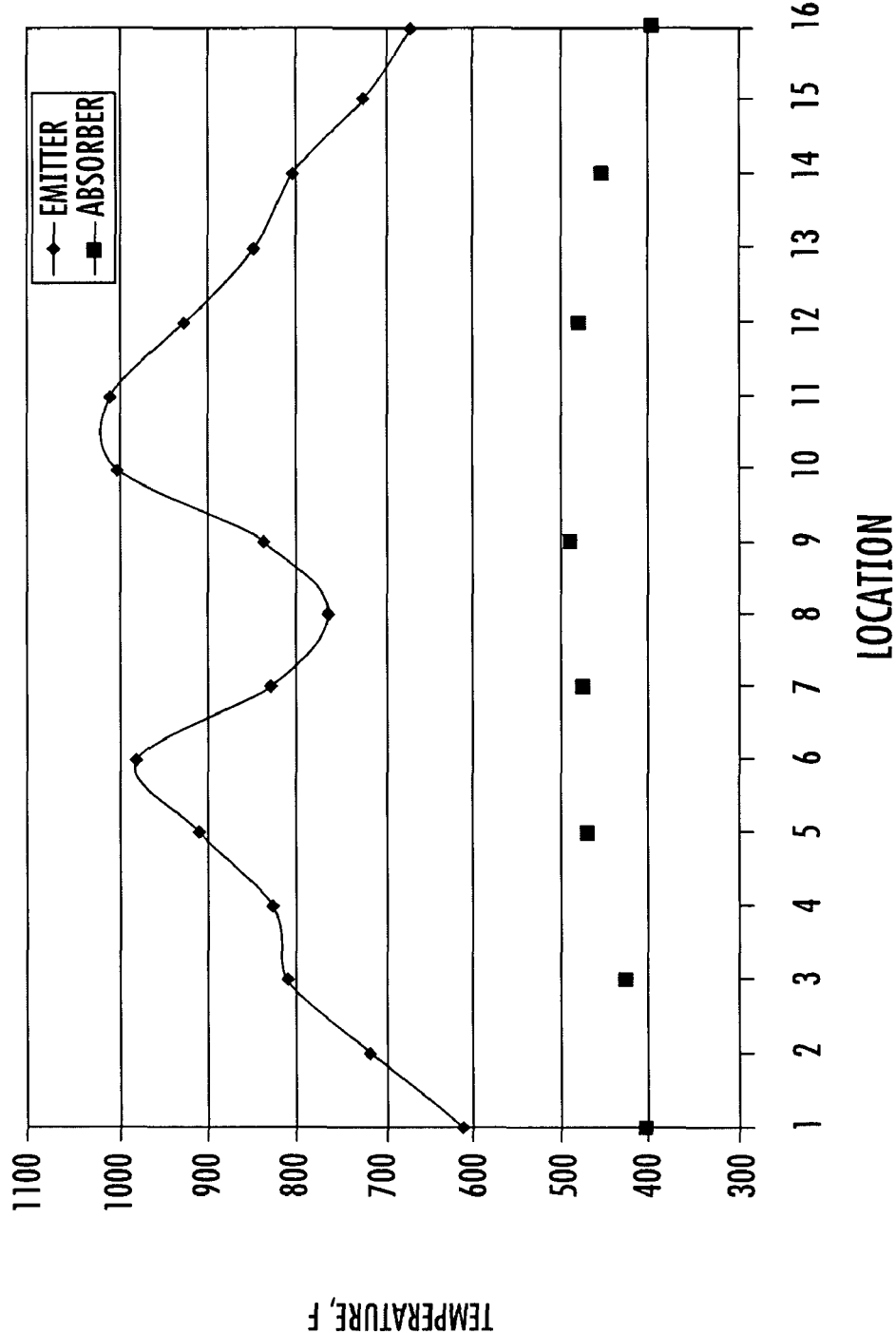
FIG. 15 is a diagram that illustrates the distribution of energy associated with another concave emitter, with measurements taken in lines that are perpendicular to the axis of the curve of the concave emitter, in accordance with the first embodiment of the present invention.

FIG. 15 shows the distribution of energy associated with an example of the solid concave emitter 38 of the first embodiment, wherein the concave emitter has a depth (dimension X) of about 2.75 inches and has a projected area (e.g., plane of absorption 69 (FIG. 13)) of about 16 inches (dimension Y) by about 19 inches, and the cooking apparatus 30 is operating at least close to its high setting (e.g., the total infrared radiant energy provided by the cooking apparatus 30 (i.e., by the concave emitter 38) is about 31,000 BTU/hr at high fire). The temperature measurements for the concave emitter 38 were taken at the concave surface of the concave emitter and are referred to as "emitter" in the legend of FIG. 15, whereas the temperature measurements proximate the plane of absorption 69 were taken at absorbers proximate the plane of absorption and referred to as "absorber" in the legend of FIG. 15, with the temperature measurements taken generally as discussed above for FIG. 14.

As shown in FIG. 15, the energy distribution at the concave surface of the concave emitter 38 is not uniform. In particular, the energy (e.g., temperature) distribution at the concave surface of the concave emitter 38 is in the form of a valley between two peaks, and more specifically the values at the opposite ends of the distribution are lower than the lowest point of the valley. As apparent from FIG. 15, at least a portion of the concave surface of the concave emitter 38 reaches at least about 600° F., and more specifically a majority of the concave surface of the concave emitter 38 reaches at least about 600° F. As also apparent from FIG. 15 and more specifically, the temperature of the concave surface of the concave emitter 38 ranges from at least about 500° F. to at least about 900° F., and even more specifically it ranges from about 600° F. to at least about 1000° F.

As shown in FIG. 15, the energy distribution at the plane of absorption 69 is reasonably uniform (e.g., substantially uniform). Nonetheless, at each of the end segments, the temperature or flux density decreases. The corresponding decrease is not too apparent (or even nonexistent) in FIG. 14 where the temperature is moderately uniform at the edges. The improvement in the distribution in FIG. 14 is, for example, because the version of the concave emitter 38 upon which FIG. 14 is based has a greater maximum depth than the version of the concave emitter 38 upon which FIG. 15. As shown in FIG. 15, the temperatures at the plane of absorption 69 are at least about 400° F., and more specifically they range from about 400° F. to about 500° F.

The temperature measurements taken for the plane of absorption 69 for FIG. 15 were made within a small circle (less than 1 inch diameter); therefore, the variation in flux density and temperature is amplified compared to the energy level of the entire surface occupied when food is being cooked. As an example, a standard 5 inch diameter hamburger would cover 19.6 square inches of the plane of absorption 69 (e.g., plane of the cooking grid). A moderate temperature or flux density variation at the plane of absorption 69 typically does not manifest itself in actual cooking applications because the food absorbs the average intensity over a larger area. For example and in accordance with the first embodiment of the present invention, when multiple hamburgers are placed at the corners of the cooking grid 32 and at the center of the cooking grid or anywhere in between they can all be cooked to 160° F. with only a slight temperature variation for a fixed cooking time, normally about 8 minutes.

Referring back to FIG. 10, the exhaust ports 98, 100 are respectively at the front and the rear of the cooking apparatus 30/grill 10 (FIGS. 1-3). However, the exhaust ports 98, 100 could be oriented differently. For example, in a grill with a single cooking apparatus 30, at least some of the components of the cooking apparatus could be in a configuration that it rotated 90 degrees with respect to the configuration shown and described above, so that the exhaust ports are respectively at the right and left sides of the grill. Examples of a few of the numerous other possible variations are discussed in the following.

A fourth embodiment of the present invention is like the first embodiment of the present invention, except for variations noted and variations that will be apparent to one of ordinary skill in the art. Due to the similarity, components of the fourth embodiment that are identical and/or function in at least some way similarly to corresponding components of the first embodiment have reference numbers incremented by 100.

Figure 17:
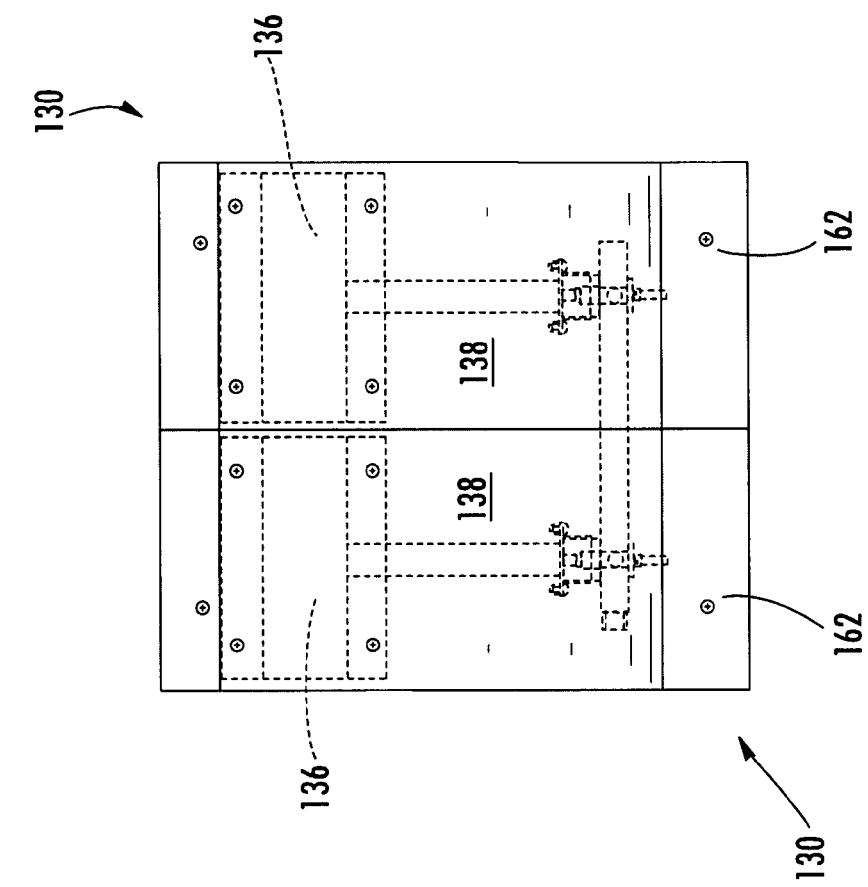
FIG. 17 is a schematic, top plan view of right and left cooking apparatuses positioned adjacent to one another for both receiving gas from the same manifold, and with cooking grids removed, in accordance with the fourth embodiment of the present invention.
Figure 16:
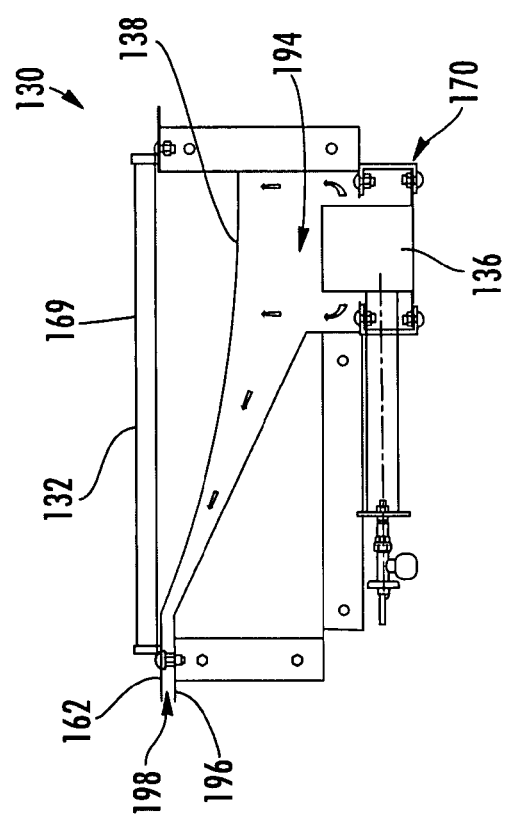
FIG. 16 is a schematic, isolated, right elevational view of a cooking apparatus, with a right wall of the burner housing having been removed to show the interior of the burner housing, in accordance with a fourth embodiment of the present invention.

FIG. 16 is a schematic, isolated, right elevational view of a cooking apparatus 130, except that a right wall of the burner housing 170 has been fully cut away to show the interior of the burner housing 170, in accordance with the fourth embodiment of the present invention. A schematic, isolated, left elevational view of the cooking apparatus 130 with the left wall of the burner housing 170 fully removed is a mirror image of FIG. 16. FIG. 17 is a schematic, top plan view of right and left cooking apparatuses 130 positioned adjacent to one another for both receiving gas from the same manifold 158, and with cooking grids 132 removed, in accordance with the fourth embodiment of the present invention. Very generally described, one difference with the fourth embodiment is that the burner 136 is placed proximate one end of the concave emitter 138, instead of being centered with respect to the concave emitter.

As best understood with reference to FIG. 16, the forward flange 162 of the emitter assembly, which includes the concave emitter 138, is mounted to a forward upper flange 196 of burner housing 170, so that a forward vertical gap/forward exhaust port 198, which is in communication with the heating chamber 194, is defined between the flanges 162, 196. In accordance with the fourth embodiment of the present invention, there is only the forward exhaust port 198 (i.e., there is not a rearward exhaust port 100 (FIGS. 9-11) like that of the first embodiment). Accordingly, the heating chamber 194 is typically fully closed, except for being open to the ambient environment at the air inlets (not shown in FIGS. 16 and 17, but for example see the air inlets 88 of FIGS. 9 and 10) and forward exhaust port 198, and being in communication with the interior of the plenum 150 by way of its side ports (not shown in FIGS. 16 and 17, but for example see the side ports 52 in FIG. 4). In accordance with the fourth embodiment of the present invention, the exhaust port 198 can alternatively be positioned at the rear, so that all of the hot gases can be discharged at the rear/back of a grill that incorporates the cooking apparatus 130.

Figure 18:
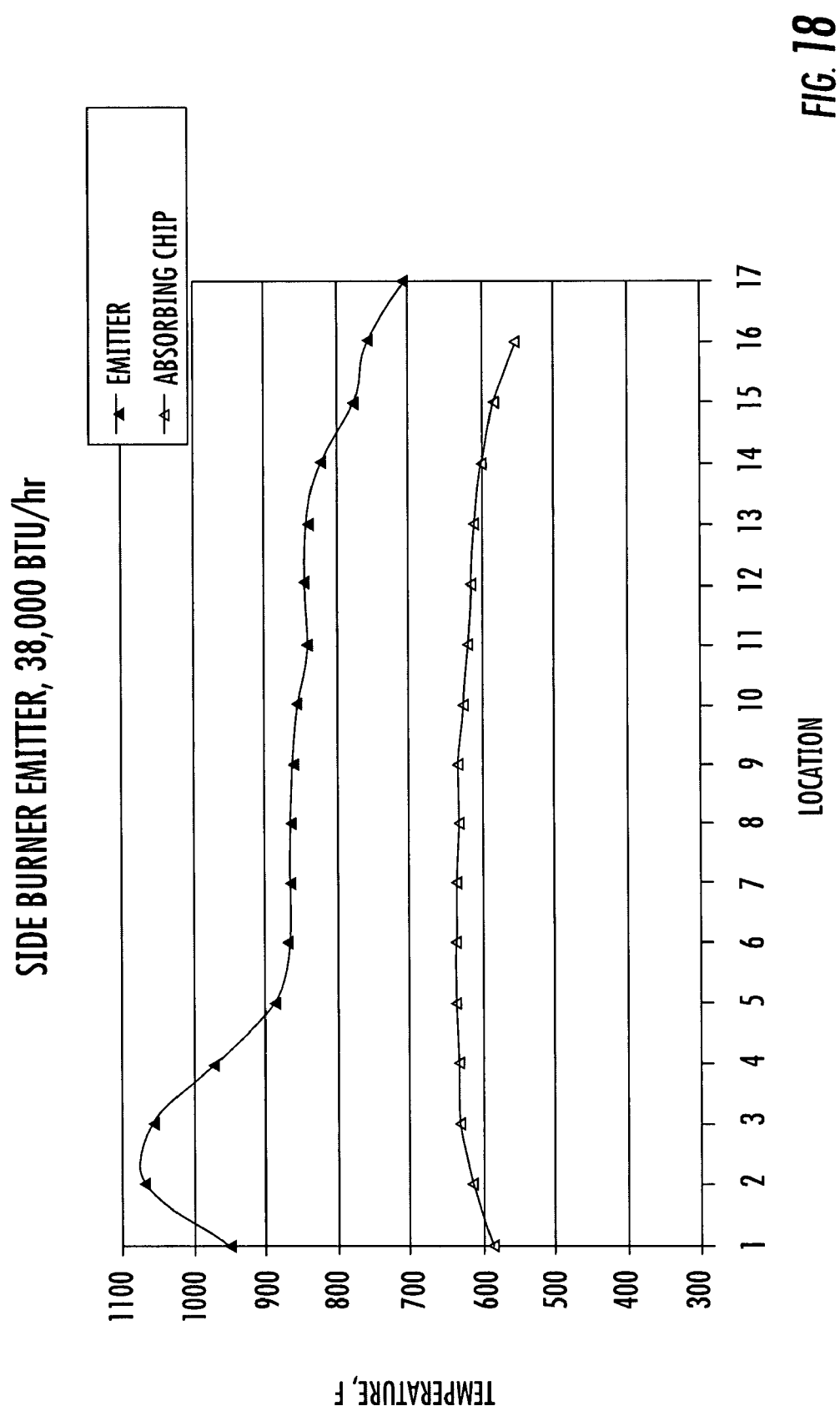
FIG. 18 is a diagram that illustrates the distribution of energy associated with a concave emitter, with measurements taken in lines that are perpendicular to the axis of the curve of the concave emitter, in accordance with the fourth embodiment of the present invention.

FIG. 18 shows the distribution of the infrared radiant energy from an example of the solid concave emitter 138 of the fourth embodiment, with the cooking apparatus 130 operating at least close to its high setting (e.g., the total infrared radiant energy provided by the cooking apparatus 130 (i.e., by the concave emitter 138) at about 38,000 BTU/hr at high fire). As mentioned above, a schematic, isolated, left elevational view of the cooking apparatus 130 with the left wall of the burner housing 170 fully removed is a mirror image of FIG. 16, and FIG. 18 generally corresponds to or may otherwise be best understood with reference to such a left view of the cooking apparatus 130. For FIG. 18, the temperature measurements were taken at segmented locations that are serially arranged generally from the rear to the front of the cooking apparatus 130, in a manner similar to that shown in FIG. 13. The distribution of the temperature at the concave emitter 138 was determined by measuring the temperature of the upper concave surface of the concave emitter in one inch segments that each have a length that is parallel to the axis of the curve of the concave emitter, and a width that extends perpendicular to the axis of the curve of the concave emitter. The temperature measurements for the concave emitter 138 were taken at the concave surface of the concave emitter along a line that is perpendicular to the axis of the curve of the concave emitter. The concave emitter 138 is referred to as "emitter" in the legend of FIG. 18. As shown in FIG. 18, the energy distribution at the concave surface of the concave emitter 138 is not uniform. In particular, the energy (e.g., temperature) distribution at the concave emitter 138 tapers downwardly from a peak, with the peak corresponding to the rearward, lower portion of the concave emitter. As apparent from FIG. 18, at least a portion of the concave surface of the concave emitter 138 reaches at least about 700° F., and more specifically a majority of the concave surface of the concave emitter 138 reaches at least about 700° F. As also apparent from FIG. 18 and more specifically, the temperature of the concave surface of the concave emitter 138 ranges from at least about 600° F. to at least about 900° F., and even more specifically it ranges from at least about 700° F. to more than 1000° F.

The distribution of the energy at the plane of absorption 169 was determined, for FIG. 18, by temperature measurements of "absorbing chips" (i.e., referred to as "absorbing chips" in the legend of FIG. 18) at the plane of absorption, with the temperature measurements being taken as generally described above, for example for the absorbers of FIG. 14. As shown in FIG. 18, the energy distribution at the plane of absorption 169 is reasonably uniform (e.g., substantially uniform), with the temperatures at the plane of absorption each being at least about 500° F., and more specifically the temperatures at the plane of absorption being within a range of about 550° F. to about 650° F.

Figure 19:
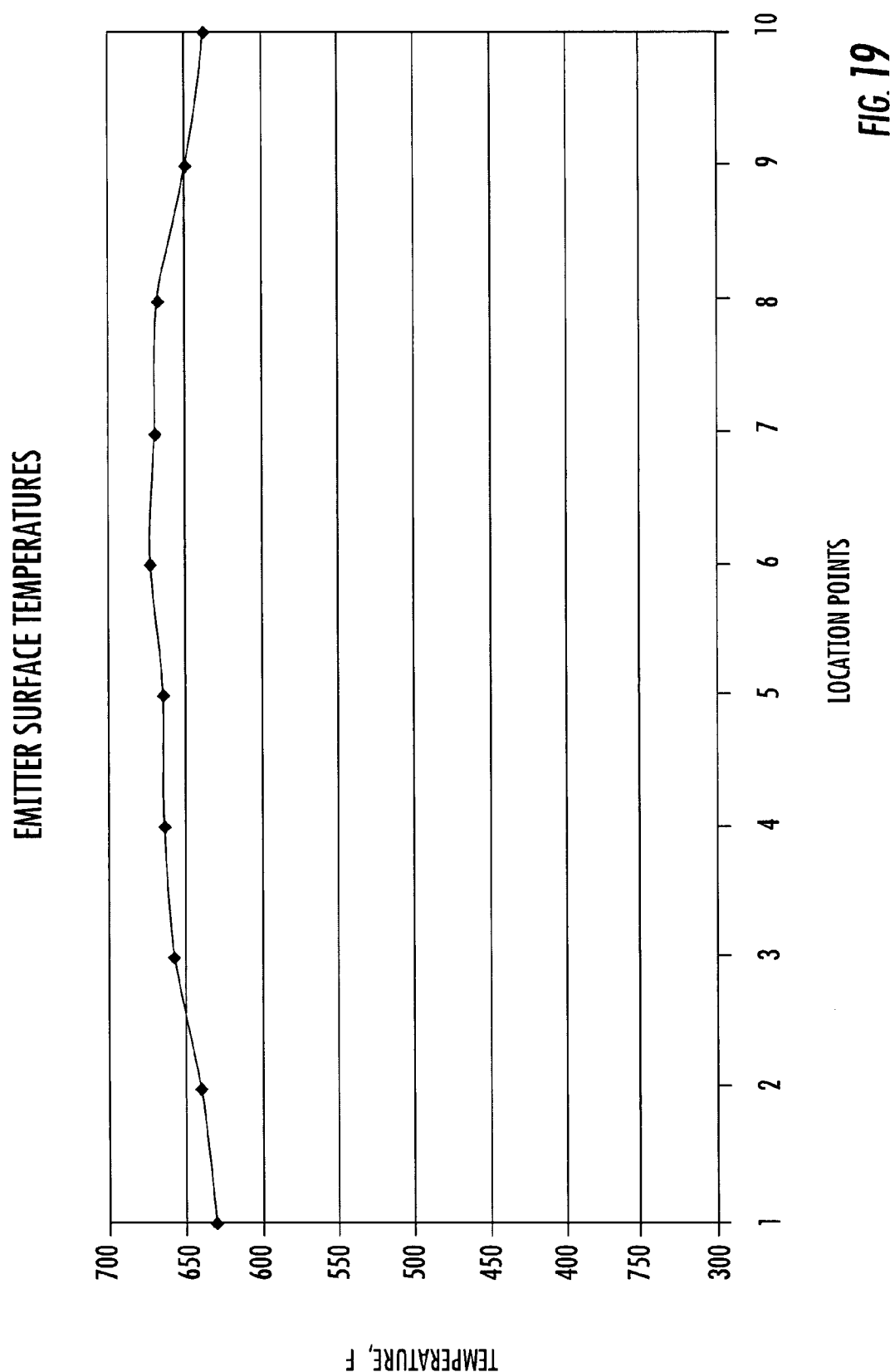
FIG. 19 is a diagram that illustrates the distribution of energy at a plane of absorption in a line that is parallel to the axis of the curve of the associated concave emitter, in accordance with the first embodiment of the present invention.

As apparent, for example, from FIGS. 14, 15 and 18, a concave emitter 38, 138 may emit radiant infrared energy so that the energy distribution is substantially uniform at the associated plane of absorption 69, 169 along a line that is perpendicular to the axis of the curve of the concave emitter and extend all the way across the plane of absorption. This can be accomplished even when the distribution of energy at the concave surface of the concave emitter 38, 138 varies over a wide range. The distribution of the energy in a line parallel to the axis of the curve of the concave emitter 38, 138 can vary, but since the emission of the energy from the concave emitter is typically far more uniform in the line parallel to the axis of the curve of the concave emitter, the variation in this direction is not very significant to the cooking process. For example, FIG. 19 is a diagram that illustrates another distribution of energy associated with the concave emitter 38 mentioned above with reference to FIG. 14 (i.e., the concave emitter that is about 4 inches deep and has a projected area (e.g., plane of absorption 69 (FIG. 13)) of about 16 inches by about 19 inches). More specifically, FIG. 19 illustrates temperature measurements taken at the plane of absorption 69 along a line that is parallel to the axis of the curve of the concave emitter 38. For the data of FIG. 19, the variation in the flux density at the plane of absorption 69 is only ±0.055 from the maximum intensity. For cooking, this variation is typically not significant.

A fifth embodiment of the present invention seeks to further minimize any variations at the plane of absorption (e.g., along a line that is parallel to the axis of the curve of the concave emitter). The fifth embodiment of the present invention is like the first embodiment of the present invention, except for variations noted and variations that will be apparent to one of ordinary skill in the art. Due to the similarity, components of the fifth embodiment that are identical and/or function in at least some way similarly to corresponding components of the first embodiment have reference numbers incremented by 200.

As best understood with reference to FIGS. 23 and 24, which are discussed in greater detail below in accordance with the fifth embodiment of the present invention, not only is the concave emitter 238 of the cooking apparatus 230 concave, it is more specifically a circular (e.g., substantially circular) emitter that may, in one example, be shaped like a bowl, or even more specifically may be shaped like a portion of sphere, whereby the plane of absorption 269 of the fifth embodiment typically has a substantially circular perimeter. That is, the cooking apparatus 230 of the fifth embodiment of the present invention may be generally round, and similarly the grill of the fifth embodiment of the present invention may be generally round.

FIGS. 20-22 are schematic, isolated, front elevation, right elevation and top plan views, respectively, of the burner 236 (e.g., port burner) and injector tube 234 of the cooking apparatus 230 of the fifth embodiment of the present invention. A left elevational view of the burner 236 and injector tube 234 is a mirror image of FIG. 21. The plenum 250 is cylindrical, and the side ports 252 (only a representative few of which are identified with their reference numeral, and which are typically covered with perforated plates) are arranged in a series that extends annularly around the cylindrical plenum. Some of the flames that respectively originate proximate the side ports 252 are schematically represented by arrows 292 in FIGS. 21 and 24.

FIG. 23 is a schematic top plan view of the cooking apparatus 230 with its cooking grid 232 partially cut away. FIG. 23 is schematic, for example, in that the burner 236 and portion of the injector tube 234 that are hidden from view beneath the emitter assembly (i.e., the round concave emitter 238 and a peripheral annular flange 262 that extends outwardly from the circular outer edge of the concave emitter) are schematically illustrated by dashed lines.

FIG. 24 is a schematic, isolated, right elevational view of the cooking apparatus 230, with the right half of the annular burner housing 270 and the right half of the annular concave emitter 238 cut away. A schematic, isolated, left elevational view of the cooking apparatus 230, with the left halves of the annular burner housing 270 and the annular concave emitter 238 cut away, would be a mirror image of FIG. 24. The burner housing 270 includes annular outer and inner walls 276, 280. As shown in FIG. 24, the portion of the inner wall 280 that partially defines the heating channel portion of the heating chamber 294 has curvature that is parallel to (e.g., substantially the same as) the curvature of the concave emitter 238 (e.g., a portion of the annular inner wall 280 may be shaped, for example, like a bowl, or more specifically like a portion of a sphere).

As best understood with reference to FIGS. 23 and 24, an annular exhaust port 298 is defined between the annular flange 262 of the emitter assembly and an annular flange 296 of the burner housing 270, and the annular exhaust port is in communication with the heating chamber 294. In accordance with the fifth embodiment of the present invention, there is only the annular exhaust port 298, which typically extends all the way around the cooking apparatus 230. Accordingly, the heating chamber 294 is typically fully closed, except for being open to the ambient environment at the air inlets (not shown in FIGS. 23 and 24, but for example see the air inlets 88 of FIGS. 9 and 10) and the annular exhaust port 298, and being in communication with the interior of the plenum 250 by way of its side ports 252.

Figure 25:
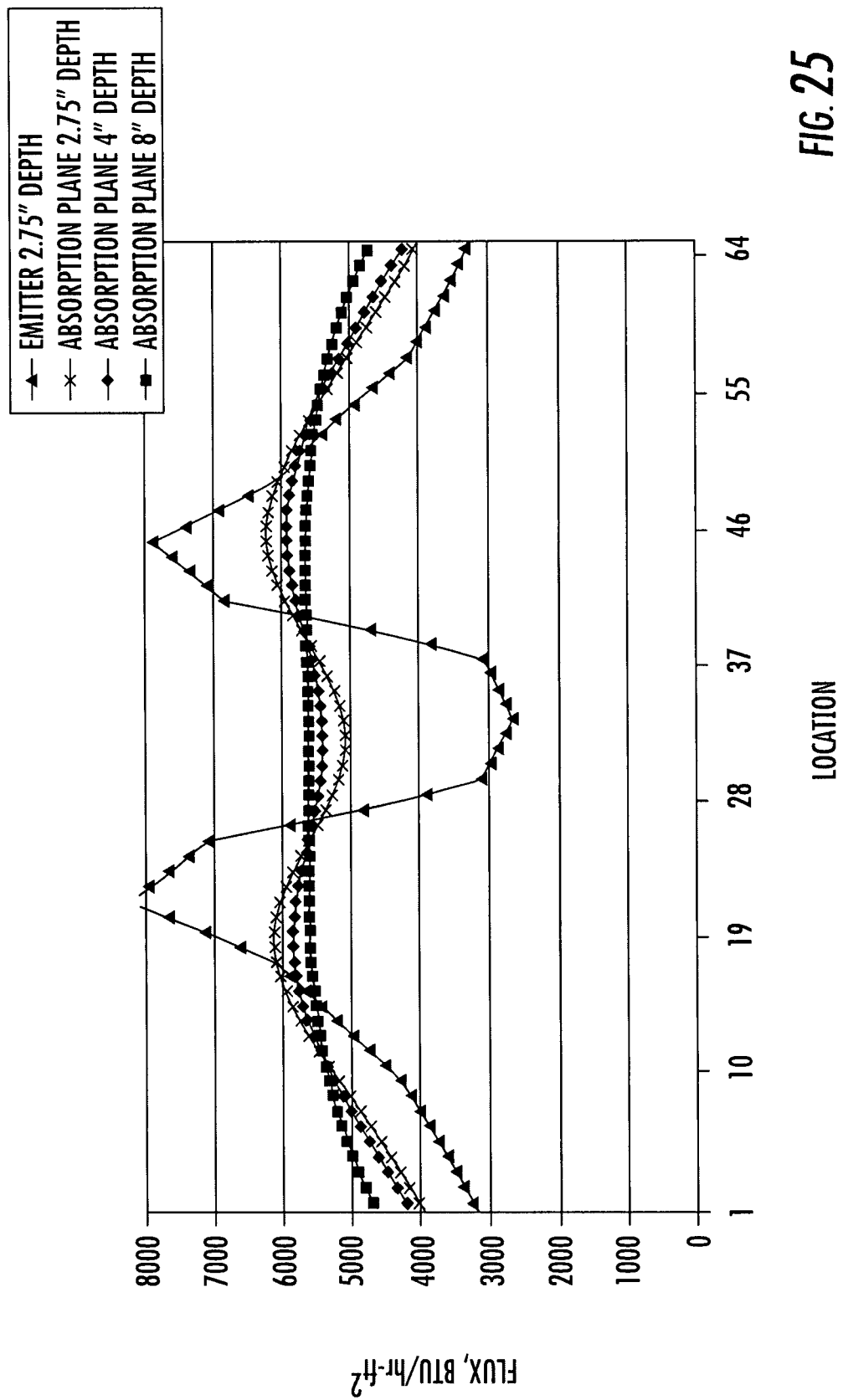
FIG. 25 is a diagram that illustrates distributions of energy, in accordance with the fifth embodiment of the present invention.

FIG. 25 shows the distribution of the energy associated with examples of (e.g., three versions of) the solid concave emitter 238 of the fifth embodiment of the present invention, with a first version of the substantially circular concave emitter 238 having a maximum depth of 2.75 inches, a second version of the substantially circular concave emitter having a maximum depth of 4.0 inches, and a third version of the substantially circular concave emitter having a maximum depth of 8.0 inches. For FIG. 25, a total of one hundred and twenty eight temperature measurements were taken and used to calculate the flux. Sixty four temperature measurements were taken at the concave surface of the concave emitter 238, along a line extending from one side of the concave emitter to the opposite side of the concave emitter, with the line extending across the center of the concave emitter. For each of the three versions of the emitter 238, a corresponding sixty four temperature measurements were taken (e.g., using "absorbers" as at least generally described above) in a line along the plane of absorption 269, with the line extending from one side of the plane of absorption to the opposite side of the plane of absorption, and extending across the center of the plane of absorption. The radian fluxes were calculated using the measured temperatures.

The flux at the concave surface of first version of the concave emitter 238, which has a maximum depth of 2.75 inches, is referred to as "emitter 2.75" depth" in the legend of FIG. 25. The flux at the plane of absorption 269 associated with the first version of the concave emitter 238, which has a maximum depth of 2.75 inches, is referred to as "absorption plane 2.75" depth" in the legend of FIG. 25. The flux at the plane of absorption 269 associated with the second version of the concave emitter 238, which has a maximum depth of 4.0 inches, is referred to as "absorption plane 4.0" depth" in the legend of FIG. 25. The flux at the plane of absorption 269 associated with the third version of the concave emitter 238, which has a maximum depth of 8.0 inches, is referred to as "absorption plane 8.0" depth" in the legend of FIG. 25.

As shown in FIG. 25, the energy distribution at the concave surface of the first version of the concave emitter 238, which has a maximum depth of 2.75 inches, is not uniform. In particular, the energy (e.g., flux) distribution at the concave surface of first version of the concave emitter 238, which has a maximum depth of 2.75 inches, is in the form of a valley between two peaks, and more specifically the values at the opposite ends of the distribution are higher than the lowest point of the valley. As apparent from FIG. 25, at least a portion of the concave surface of the concave emitter 238 has a flux of at least about 2,500 BTU/HR-ft$^2$ (e.g., at high fire). More specifically, at least a portion of the concave surface of the concave emitter 238 has a flux of at least about 3,000 BTU/HR-ft$^2$ (e.g., at high fire). Even more specifically, the concave surface of the concave emitter 238 has a flux that ranges from at least about 2,500 BTU/HR-ft$^2$ to at least about 7,000 BTU/HR-ft$^2$ (e.g., at high fire). Even more specifically, the concave surface of the concave emitter 238 has a flux that ranges from at least about 3,000 BTU/HR-ft$^2$ to at least about 8,000 BTU/HR-ft$^2$ (e.g., at high fire).

As mentioned above, a relatively "cool zone" (e.g., which seeks to avoid flair ups, and the like) may be present, such as at the lowest area of the concave surface of the concave emitter 230. In accordance with the fifth embodiment, the cool zone is centrally located on the concave emitter 230 (e.g., between locations 30 and 38 in FIG. 25). As shown in FIG. 25, the flux at the cool zone of the concave emitter 230 is substantially less (e.g., at least about 1,000 BTU/HR-ft$^2$ less (e.g., at high fire), or even more specifically at least about 2,000 BTU/HR-ft$^2$ less (e.g., at high fire)) than the flux at the corresponding central portion of the plane of absorption 269.

In contrast to the irregular distribution at the surface of the concave emitter 238, as shown in FIG. 25, the energy distribution at the plane of absorption 269 is reasonably uniform (e.g., substantially uniform). In addition, FIG. 25 shows that the uniformity at the plane of absorption 269 improves with the depth of the concave emitter 238. As apparent from FIG. 25, at least a portion of the plane of absorption 269 has a flux of at least about 3,000 BTU/HR-ft$^2$ (e.g., at high fire). More specifically, at least a portion of the plane of absorption 269 has a flux of at least about 4,000 BTU/HR-ft$^2$ (e.g., at high fire). Even more specifically, the plane of absorption 269 has a flux that ranges from at least about 3,500 BTU/HR-ft$^2$ to at least about 5,000 BTU/HR-ft$^2$ (e.g., at high fire). Even more specifically, the plane of absorption 269 has a flux that ranges from at least about 4,000 BTU/HR-ft$^2$ to at least about 5,500 BTU/HR-ft$^2$ (e.g., at high fire).

While the curves of FIG. 25 vividly demonstrate the improved uniformity of the infrared radiant energy at the plane of absorption 269, in actual use the uniformity is further improved because, for example, the average energy absorbed in an area (for example, the size of an average steak) is more uniform than the energy absorbed at a finite point. For example, hamburgers have been very successfully cooked on a circular grill (not shown) incorporating a cooking apparatus 230 in accordance with the fifth embodiment of the present invention. More specifically, hamburgers 0.5 inches thick and 5.0 inches in diameter were randomly placed on the cooking grid 232 of a cooking apparatus 230 of the fifth embodiment and after 8 minutes, the temperature of the hamburgers varied form 161° F. to 165° F.

The cooking apparatuses of the above-described embodiments of the present invention can provide benefits in addition to there being a substantially uniform distribution of energy at the plane of absorption. Examples of additional advantages are described in the following, for example, with reference to the first embodiment of the present invention that is shown in FIGS. 1-10. The cooking apparatus 30 can provide both high intensity infrared radiant energy to the cooking grid 32 for rapid searing of meat, and then the burner 36 can be turned down to a very low energy output that would allow for hours of slow cooking time. Slower cooking is required for large cuts of meat, such as roasts or whole hams. The grill 10 can also be operated at low enough energy levels to barbeque, over extended periods of time.

For example in the fifth embodiment of the present invention shown in FIGS. 20-24, the concave emitter 238 can be characterized as being generally or substantially bowl-shaped. In accordance with one example of a method of operation described in the following, the bowl-shaped concave emitter 238 may simplify the cleaning process. After cooking, any debris in the bowl-shaped concave emitter 238 may be removed by removing the bowl-shaped concave emitter from the cooking apparatus 230 and inverting the bowl-shaped concave emitter. Also, the removed bowl-shaped concave emitter 238 may be scraped to remove any residue. Thereafter, the bowl-shaped concave emitter 238 may be placed back into the cooking apparatus 230 and/or the body of the grill such as by the use of alignment pins, brackets, or the like. This method of cleaning can eliminate the use of a grease tray used in most other infrared type grills. This method can also be carried out with the concave emitters of other embodiments, in which case the concave emitter may have upright side walls (e.g., right and left side walls respectively attached to the opposite right and lefts sides/ends of the concave emitter 38) to form a somewhat pan-shaped concave emitter, so that the pan-shaped concave emitter can be used generally as discussed above for the bowl-shaped concave emitter.

In accordance with another acceptable method, the bowl-shaped and pan-shaped concave emitters, or the like, can have charcoal or wood chips placed therein, so that the charcoal or wood chips can be ignited from the energy of the emitter. Broiling of the food can then be accomplished by burning the charcoal or wood alone by turning off the burner, or a combination of the methods of broiling can be used by leaving the burner on. As another example, grills of the exemplary embodiments of the present invention may be used as a smoker by placing wood chips of the desired flavor in the bowl-shaped concave emitter, pan-shaped concave emitter, or the like, while broiling, or the wood chips can be placed in a container that is placed on the concave emitter.

As mentioned above, for the above-described embodiments that employ a solid concave emitter, the food being cooked on the cooking grid is typically cooked with almost 100% infrared radiant energy. In contrast, there are many convection types of grills on the market that employ port-type burners that cook the food primarily by convective energy. Many of these conventional types of grills employ a type of cover over the burner (usually metal) to protect the burner from the grease and other deposits from the cooking process, but the covers over the burners typically provide a negligible amount of infrared radiant energy to the food being cooked, and the hot gasses are not substantially diverted away from the food being cooked, so that the food is primarily cooked by convective energy. In contrast, and as mentioned above, when the first through fifth embodiments of the present invention employ a solid concave emitter, the emitter is heated by way of the heating chamber that directs the hot gasses away from the food being cooked, so that the food is cooked with substantially 100% infrared radiant energy.

Figure 26:
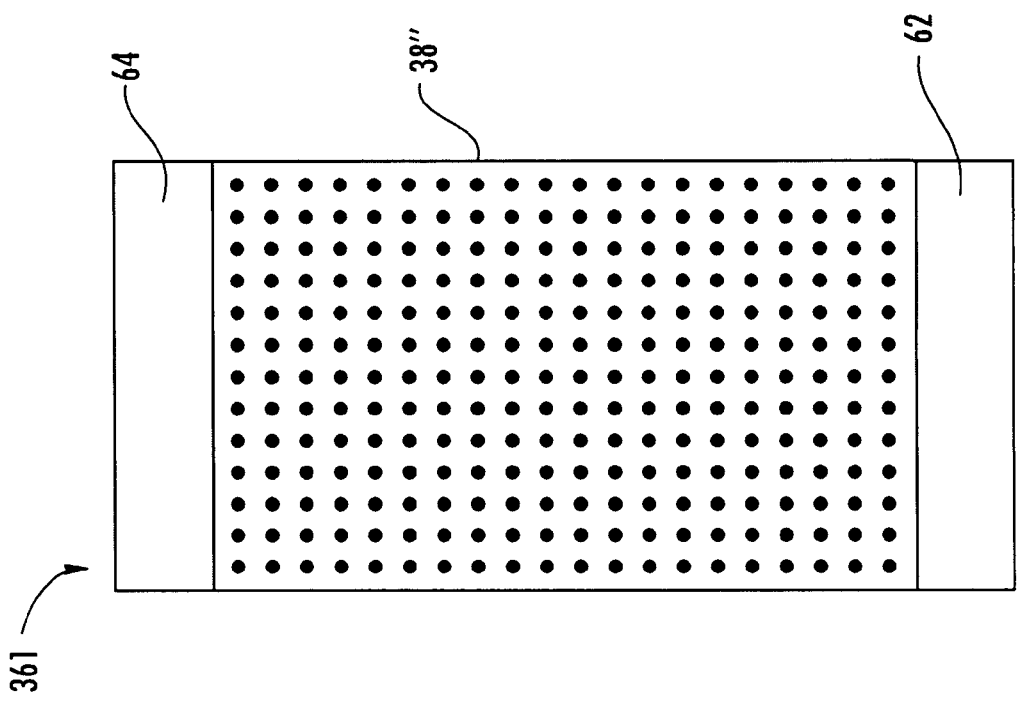
FIG. 26 is a schematic, isolated, top plan view of an emitter assembly in accordance with another embodiment of the present invention.

As mentioned above with reference to alternative embodiments of the present invention, the solid concave emitters of the first through fifth embodiments described herein may be replaced with concave emitters that are not solid (e.g., concave emitters and/or concave emitting surfaces with one or more openings (e.g., holes) that extend therethrough, such as perforated emitters, screen-type emitters, grate-like emitters, emitters in the form of overlapping plates with gaps therebetween, or other suitable non-solid concave emitters and/or concave emitting surfaces). For example, FIG. 26 is an isolated, top plan view of an emitter assembly 361 in accordance with another embodiment of the present invention, with this other embodiment being like the first embodiment of the present invention, except for variations noted and variations that will be apparent to one of ordinary skill in the art. The emitter assembly 361 is like the emitter assembly of the first embodiment, except, for example, in contrast to the solid concave emitter 38 (FIGS. 3, 8, 10, 12 and 13), the concave emitter 38" of the emitter assembly 361 has at least one, and typically a plurality (e.g., multiplicity) of openings (e.g., holes) that extend completely therethrough, and the openings are schematically illustrated by stippling (e.g., dots) in FIG. 26. Except for its openings, the concave emitter 38" can be like (e.g., substantially like) the solid concave emitter 38. For example, the concave emitter 38" may be in the form of a perforated concave emitter, a concave screen-type emitter, a concave grate-like emitter, a concave emitter in the form of overlapping plates with gaps therebetween, or any other type of concave emitter/concave emitting surface that includes at least one or a plurality of openings that extend therethrough and functions suitably. As a result of the openings in the concave emitter 38", at least some of the gasses in the heating chamber (e.g., see the heating chamber 94 of FIG. 10) that is partially defined by the concave emitter 38" can pass through the openings in the concave emitter 38", and then the gasses may pass through a support member (e.g., a support member for supporting food to be cooked (e.g., a cooking grid, such as the cooking grid 32 shown in FIGS. 2, 3, 7, 9 and 10), so that the gasses contact the food).

The openings in the concave emitter 38" are not limited to the configuration of the stippling (e.g., dots) by which the openings are schematically illustrated in FIG. 26. Each of the one or more openings in the concave emitter 38" can be in a variety of different shapes, and the overall arrangement (e.g., pattern) of the openings can vary. In one example, the openings in the concave emitter 38" may be sufficiently large, sufficient in number and/or arranged such that the above-discussed exhaust port(s) (e.g., see the exhaust ports 98, 100 in FIGS. 10 and 11) may be resized or omitted. In one example, the openings in the concave emitter 38" may be omitted from the central region of the concave emitter and the openings may be concentrated proximate the front and rear edges or the circular peripheral edge of the concave emitter, with the exhaust port(s) (e.g., see the exhaust ports 98, 100 in FIGS. 10 and 11) being replaced by the openings which extend completely through the concave emitter and are concentrated proximate the front and rear edges or the circular peripheral edge of the concave emitter.

It will be understood by those skilled in the art that while the present invention has been discussed above with reference to exemplary embodiments, various additions, modifications and changes can be made thereto without departing from the spirit and scope of the invention as set forth in the following claims.

What is claimed is:

1. An apparatus for cooking food with infrared radiant energy, the apparatus comprising:
   a burner having a cooking setting which is a highest cooking setting for the burner;
   a support member for supporting the food; and
   an emitter mounted between the burner and the support member so that the emitter is for
   absorbing energy from the burner, wherein
   the emitter includes a substantially concave surface that is oriented toward the support member and is for emitting infrared radiant energy toward the support member,
   the substantially concave surface of the emitter comprises a metal surface, and said metal surface was modified, prior to any use of the apparatus for cooking, in a manner for increasing emissivity of the substantially concave surface, so that the substantially concave surface of the emitter has an emissivity of at least about 0.6 when the burner is operated at the highest cooking setting,
   when the burner is operated at the highest cooking setting, more than 60% of the infrared radiant energy emitted from the substantially concave surface will be longer than 5 microns in wavelength,
   the burner will heat the emitter in a manner so that a first section of the emitter will be cooler than a second section and a third section of the emitter,
   the first section of the emitter is positioned between the second section and the third section of the emitter, and
   the first section of the emitter is located at a lowermost portion of the substantially concave surface.

2. The cooking apparatus according to claim 1, wherein openings extend through the substantially concave surface.

3. The cooking apparatus according to claim 1, wherein the emitter extends substantially horizontally.

4. The cooking apparatus according to claim 1, wherein the burner is substantially centrally located with respect to the emitter.

5. The cooking apparatus according to claim 1, wherein the first section of the emitter is a central portion and wherein a flux of infrared radiant energy emitted from the substantially concave surface decreases toward the central portion from the second and third sections of the emitter.

6. The cooking apparatus according to claim 1, further comprising a housing at least for the burner, wherein:
   the emitter includes a second surface that is opposite the substantially concave surface of the emitter and is for being in contact with products of combustion from the burner;
   a heating chamber is at least partially defined between the housing and the second surface of the emitter;
   the heating chamber is adapted for at least partially containing the products of combustion from the burner;
   the heating chamber comprises at least one exhaust port ocated at a position that is higher than a lowest part of the substantially concave surface of the emitter; and
   the heating chamber and the exhaust port are adapted for directing the products of combustion out of the apparatus, so that the products of combustion are substantially prevented during cooking from in any way contacting the food supported on the support.

7. The cooking apparatus according to claim 6, wherein the at least one exhaust port is positioned below the support member.

8. The cooking apparatus according to claim 1, wherein the emitter is substantially round in a top plan view of the emitter.

9. The cooking apparatus according to claim 1, wherein the emitter comprises a series of straight segments with angles respectively interposed therebetween.

10. The cooking apparatus according to claim 1, wherein:
    the substantially concave surface of the emitter defines an axis of curvature of the substantially concave surface, and
    the burner includes a plurality of ports that are offset with respect to the axis of curvature.

11. The cooking apparatus according to claim 1, wherein the metal surface, which was modified in the manner to increase the emissivity of the substantially concave surface of the emitter to at least about 0.6, is selected from the group consisting of:
    an oxidized metal surface;
    a roughened metal surface;
    a sand-blasted metal surface;
    a metal surface that has been sand blasted and oxidized; and
    a metal surface that has been coated with a material selected from the group consisting of ceramic, glass and porcelain.

12. The cooking apparatus according to claim 1, wherein the cooking apparatus is configured for cooking the food primarily with a substantially uniform distribution of infrared radiant energy that is provided from the substantially concave surface of the emitter to a substantially horizontal plane at or proximate to the support member.

13. The cooking apparatus according to claim 1, further comprising a housing having inner and outer walls, wherein:
the emitter includes a second surface that is opposite the substantially concave surface of the emitter and is for being in contact with the products of combustion from the burner;
the inner wall of the housing is positioned between the second surface of the emitter and the outer wall of the housing;
a heating chamber, which is for containing products of combustion from the burner, is at least partially defined between the inner wall of the housing and the second surface of the emitter; and
another chamber is between the inner and outer walls of the housing, wherein the another chamber is an insulating chamber.

14. The cooking apparatus according to claim 1, further comprising a housing including an outer wall, wherein:
the burner is positioned in the housing;
the emitter includes a second surface that is opposite the substantially concave surface of the emitter and is for being in contact with the products of combustion from the burner;
the housing further includes an inner wall positioned between the second surface of the emitter and the outer wall of the housing so that
a heating chamber, which is for at least partially containing products of combustion from the burner, is at least partially defined between the inner wall of the housing and the second surface of the emitter, so that the heating chamber extends below the second surface of the emitter, and the second surface of the emitter is for being in contact with the products of combustion within the heating chamber, and
an other chamber is between the inner and outer walls of the housing, wherein the other chamber extends laterally of the heating chamber, and the other chamber is positioned between the heating chamber and the exterior of the housing for restricting lateral heat loss from the heating chamber to the exterior of the housing.

15. The cooking apparatus according to claim 14, comprising insulation in the other chamber that is between the inner and outer walls of the housing for restricting lateral heat loss from the heating chamber to the exterior of the housing.

16. The cooking apparatus according to claim 14, wherein the inner wall of the housing is in opposing face-to-face relation with and extends upwardly along the second surface of the emitter so that the heating chamber includes a heating channel that curves upwardly along the second surface of the emitter.

17. The cooking apparatus according to claim 1, comprising an emitter assembly that includes the emitter, wherein:
the support member comprises a cooking grid, and
the cooking grid is supported by the emitter assembly.

18. The cooking apparatus according to claim 17, wherein:
the emitter assembly includes flanges extending from respective edges of the emitter, and
the cooking grid is positioned upon the flanges.

19. The cooking apparatus according to claim 1 wherein:
the burner has at least one additional cooking setting,
the one additional cooking setting is a lowest cooking setting for the burner,
the substantially concave surface of the emitter has an emissivity of at least 0.6 when the burner is operated at the lowest cooking setting, and
when the burner is operated at the lowest cooking setting, at least 80% of the infrared radiant energy emitted from the substantially concave surface will be longer than 5 microns in wavelength.

20. A method of cooking food, the method comprising using the apparatus of claim 1 to cook the food primarily with infrared radiant energy, comprising:
heating the emitter by operating the burner, so that the emitter emits infrared radiant energy from the substantially concave surface of the emitter; and
supporting the food with the support member so that the substantially concave surface of the emitter is oriented toward the food.

21. The method according to claim 20, wherein the step of heating is carried out so that an energy distribution at the substantially concave surface at least defines a shape comprising a valley between two peaks.

22. The method according to claim 20, wherein the step of heating is carried out so that at least a portion of the concave surface is at least about 600° F.

23. The method according to claim 20, wherein:
the concave surface of the emitter defines an axis of curvature that extends in a longitudinal direction, and
each of the first, second and third sections of the emitter extend in the longitudinal direction from one end of the emitter to an opposite end of the emitter.

24. The method according to claim 20, wherein the step of heating the emitter comprises heating the emitter with hot gasses, and further comprising directing the hot gasses away from the food, so that the hot gasses are substantially prevented from in any way contacting the food during cooking.

25. The method according to claim 24, wherein the steps of heating the emitter with hot gasses and directing the hot gasses away from the food comprise:
at least partially containing the hot gasses in a heating chamber,
exhausting the hot gasses from the chamber by way of at least one exhaust port, and
positioning the food away from the exhaust port, comprising the at least one exhaust port being positioned below the support member.

26. A grill for cooking food with infrared radiant energy, the grill comprising:
a body having a chamber;
a burner mounted in the chamber, the burner having a cooking setting which is a highest cooking setting for the burner;
a support member for supporting the food, wherein the support member is positioned above the burner; and
an emitter positioned between the burner and the support member so that the emitter is for absorbing energy from the burner, wherein
the emitter includes a substantially concave surface that is oriented toward the support member and is for emitting infrared radiant energy toward the support member,
the substantially concave surface of the emitter has a depth and the emitter will be heated by the burner at the highest cooking setting such that, for an area having a size of at least one square foot in a substantially horizontal plane located at or proximate to the support member, an effective distribution of the infrared radiant energy from the substantially concave surface will be provided so that (a) temperatures measured using a one square inch size metal absorber chip placed across the area along a first line running through a center of the area will not vary by more than 100° F. and (b) temperatures measured using a one square inch size metal absorber chip placed across the area along a second line running through the center of the area will also not vary by more than 100° F., the second line being perpendicular to the first line, the substantially concave surface includes a lowermost region for receiving residue from the food being cooked, and the grill is adapted for maintaining the lowermost region at a lower temperature than a relatively higher region of the substantially concave surface while the burner is operating, so that the grill is adapted for substantially preventing burning of the residue received in the lowermost region.

27. A grill for cooking food with infrared radiant energy, the grill comprising:

a body having a chamber;

a lid for closing the chamber;

a burner mounted in the chamber, the burner having a cooking setting which is a highest cooking setting for the burner;

a support member for supporting the food, wherein the support member is positioned above the burner; and an emitter positioned between the burner and the support member so that the emitter is for absorbing energy from the burner, wherein the emitter includes a substantially concave surface that is oriented toward the support member and is for emitting infrared radiant energy toward the support member;

the substantially concave surface of the emitter has a depth and the emitter will be heated by the burner at the highest cooking setting such that, for an area having a size of at least one square foot in a substantially horizontal plane located at or proximate to the support member, an effective distribution of the infrared radiant energy from the substantially concave surface will be provided so that (a) temperatures measured using a one square inch size metal absorber chip placed across the area along a first line running through a center of the area will not vary by more than 100° F. and (b) temperatures measured using a one square inch size metal absorber chip placed across the area along a second line running through the center of the area will also not vary by more than 100° F., the second line being perpendicular to the first line;

the emitter having a second surface that is opposite the substantially concave surface of the emitter and is for being in contact with products of combustion from the burner;

a heating cavity is at least partially defined between at least a lower portion of the chamber and the second surface of the emitter;

the heating cavity being adapted for receiving the products of combustion from the burner;

the heating cavity comprising at least one exhaust port; and the heating cavity and the exhaust port being adapted for directing the products of combustion out of the heating cavity so that the products of combustion will be substantially prevented during cooking from in any way contacting the food supported on the support member when the lid is closed.

28. The grill according to claim 27 wherein the emitter is substantially round in a top plan view of the emitter.

29. The grill according to claim 27 wherein the emitter will be heated by the burner at the highest cooking setting such that, an energy distribution will be produced at the substantially concave surface having a shape comprising a central valley between two peaks.

30. The grill according to claim 27 wherein:

the burner will heat the emitter in a manner so that a first section of the emitter will be cooler than a second section and a third section of the emitter, the first section of the emitter is positioned between the second and third sections of the emitter, and the first section of the emitter is located at a lowermost portion of the substantially concave surface.

31. The grill according to claim 27 wherein:

the concave surface of the emitter defines an axis of curvature that extends in a longitudinal direction, the first line is parallel with the axis of curvature, and the second line is perpendicular to the axis of curvature.

32. The grill according to claim 31, wherein the emitter will be heated by the burner at the highest cooking setting such that an energy distribution having a shape comprising a central valley between two peaks will be produced at the substantially concave surface in a substantially vertical plane containing the second line.

33. A grill for cooking food with infrared radiant energy, the grill comprising:

a body having a chamber;

a burner mounted in the chamber, the burner having a cooking setting which is a highest cooking setting for the burner;

a support member for supporting the food, wherein the support member is positioned above the burner; and an emitter positioned between the burner and the support member so that the emitter is for absorbing energy from the burner, wherein the emitter includes a substantially concave surface that is oriented toward the support member and is for emitting infrared radiant energy toward the support member, the substantially concave surface of the emitter has a depth and the emitter will be heated by the burner at the highest cooking setting such that, for an area having a size of at least one square foot in a substantially horizontal plane located at or proximate to the support member, an effective distribution of the infrared radiant energy from the substantially concave surface will be provided so that (a) temperatures measured using a one square inch size metal absorber chip placed across the area along a first line running through a center of the area will not vary by more than 100° F. and (b) temperatures measured using a one square inch size metal absorber chip placed across the area along a second line running through the center of the area will also not vary by more than 100° F., the second line being perpendicular to the first line, the substantially concave surface of the emitter comprises a metal surface and the metal surface was modified, prior to any use of the grill for cooking, in a manner effective for increasing emissivity of the concave surface so that the substantially concave surface of the emitter has an emissivity of at least 0.6 when the burner is operated at the highest cooking setting and, when the burner is operated at the highest cooking setting, more than 60% of the infrared radiant energy emitted from the substantially concave surface will be longer than 5 microns in wavelength.

34. The grill according to claim 33, wherein:

the burner has at least one additional cooking setting, the one additional cooking setting is a lowest cooking setting for the burner, the substantially concave surface of the emitter has an emissivity of at least 0.6 when the burner is operated at the lowest cooking setting, and when the burner is operated at the lowest cooking setting, at least 80% of the infrared radiant energy emitted from the substantially concave surface will be longer than 5 microns in wavelength.

35. A grill for cooking food with infrared radiant energy, the grill comprising:

a body having a chamber;

a burner mounted in the chamber, the burner having a cooking setting which is a highest cooking setting for the burner;

a support member for supporting the food, wherein the support member is positioned above the burner; and an emitter positioned between the burner and the support member so that the emitter is for absorbing energy from the burner, wherein the emitter includes a substantially concave surface that is oriented toward the support member and is for emitting infrared radiant energy toward the support member, the substantially concave surface of the emitter comprises a metal surface and the metal surface was modified, prior to any use of the grill for cooking, in a manner effective for increasing emissivity of the concave surface so that the substantially concave surface of the emitter has an emissivity of at least 0.6 when the burner is operated at the highest cooking setting and, when the burner is operated at the highest cooking setting, more than 60% of the infrared radiant energy emitted from the substantially concave surface will be longer than 5 microns in wavelength.

36. The grill according to claim 35, wherein:

the burner has at least one additional cooking setting;

the one additional cooking setting is a lowest cooking setting for the burner;

the substantially concave surface of the emitter has an emissivity of at least 0.6 when the burner is operated at the lowest cooking setting; and when the burner is operated at the lowest cooking setting, at least 80% of the infrared radiant energy emitted from the substantially concave surface will be longer than 5 microns in wavelength.

* * * * *

UNITED STATES PATENT AND TRADEMARK OFFICE
CERTIFICATE OF CORRECTION

PATENT NO. : 8,074,634 B2  Page 1 of 1
APPLICATION NO. : 11/903818
DATED : December 13, 2011
INVENTOR(S) : Best It is certified that error appears in the above-identified patent and that said Letters Patent is hereby corrected as shown below:

In Claim 6, Col. 26, Line 31: The word "ocated" is corrected to read --located--.

Signed and Sealed this
Thirty-first Day of January, 2012

David J. Kappos
*Director of the United States Patent and Trademark Office*